United States Patent [19]
Horizoe et al.

[11] Patent Number: 6,133,499
[45] Date of Patent: Oct. 17, 2000

[54] METHOD AND APPARATUS FOR PRODUCING SUPERHEATED STEAM USING HEAT FROM THE INCINERATION OF WASTE MATERIAL

[75] Inventors: Hirotoshi Horizoe; Yoshihito Shimizu; Jun Sato; Shizuo Yasuda; Yuji Kaihara; Yoshimasa Kawami, all of Yokohama, Japan

[73] Assignee: Mitsubishi Heavy Industries, Ltd., Tokyo, Japan

[21] Appl. No.: 08/945,591

[22] PCT Filed: Feb. 27, 1997

[86] PCT No.: PCT/JP97/00573

§ 371 Date: Jan. 12, 1998

§ 102(e) Date: Jan. 12, 1998

[87] PCT Pub. No.: WO97/32161

PCT Pub. Date: Sep. 4, 1997

[30] Foreign Application Priority Data

| Feb. 29, 1996 | [JP] | Japan | .................................. 8-69067 |
| Feb. 29, 1996 | [JP] | Japan | .................................. 8-69090 |
| Feb. 29, 1996 | [JP] | Japan | .................................. 8-69383 |
| Feb. 29, 1996 | [JP] | Japan | .................................. 8-69388 |
| Feb. 29, 1996 | [JP] | Japan | .................................. 8-69393 |

[51] Int. Cl.$^7$ .................................. A62D 3/00; B01J 8/18; B09B 3/00; F23B 7/00; F23G 5/00; F27B 15/00; F27B 15/08; F27B 15/14

[52] U.S. Cl. .................................. 588/208; 110/234; 110/243; 110/244; 110/245; 110/255; 422/139; 422/141; 422/142; 422/143; 422/145; 422/146; 423/DIG. 18; 588/208; 588/213; 588/214; 588/215; 588/216; 588/217; 588/226; 588/900

[58] Field of Search .................................. 588/208, 213, 588/214, 215, 216, 217, 226, 900; 423/DIG. 18; 60/39.12, 643, 648, 655; 422/139, 141, 142, 143, 145, 146; 110/234, 243, 244, 245, 255

[56] References Cited

U.S. PATENT DOCUMENTS

5,327,726  7/1994  Damna et al. .......................... 60/648

FOREIGN PATENT DOCUMENTS

| 59-215503 | 12/1984 | Japan . |
| 5-346204 | 12/1993 | Japan . |
| 8-128601 | 5/1996 | Japan . |

OTHER PUBLICATIONS

Robert H. Perry and Cecil H. Chilton. Chemical Engineers' Handbook. Fifth Edition McGraw Hill Book Company. p. 20–77, 1973.

*Primary Examiner*—Tom Dunn
*Assistant Examiner*—Maribel Medina
*Attorney, Agent, or Firm*—Evenson, McKeown, Edwards & Lenahan, P.L.L.C.

[57] ABSTRACT

According to the present invention, boiler water is pressurized so that its boiling point is set at approximately 200° C. to 320° C. The boiler water is heated in at least two stages. Thermal energy of gases containing chlorine compounds is used to heat the water to its boiling point. Thermal energy of gases which do not contain chlorine compounds is used to heat the water from its boiling point until superheated steam of a given temperature is generated. The heating which uses the thermal energy of gases containing chlorine compounds is accomplished using the thermal energy from the combustion of pyrolysis gases obtained from a pyrolysis means in which waste material is supplied into a chamber containing a fluidized bed medium which has been heated to at least 300° C., and a pyrolytic reaction is induced. The heating which uses the thermal energy of gases which do not contain chlorine compounds is accomplished using the thermal energy obtained from a char combustion means to combust char in which a char mixture consisting of unpyrolyzed residue and fluidized bed medium removed from the pyrolysis means is fluidized by a stream of air, and the unpyrolyzed residue is combusted.

23 Claims, 18 Drawing Sheets

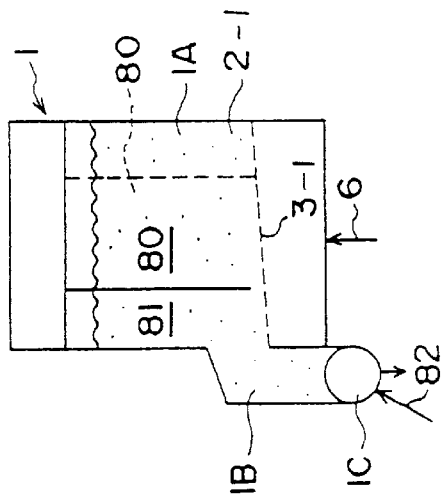
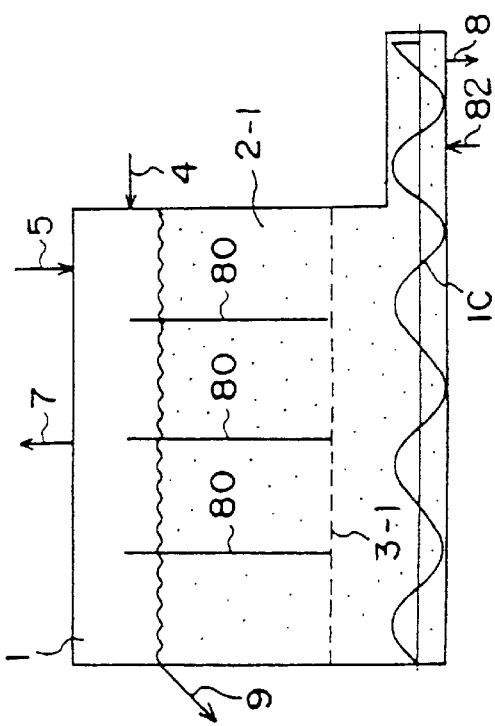
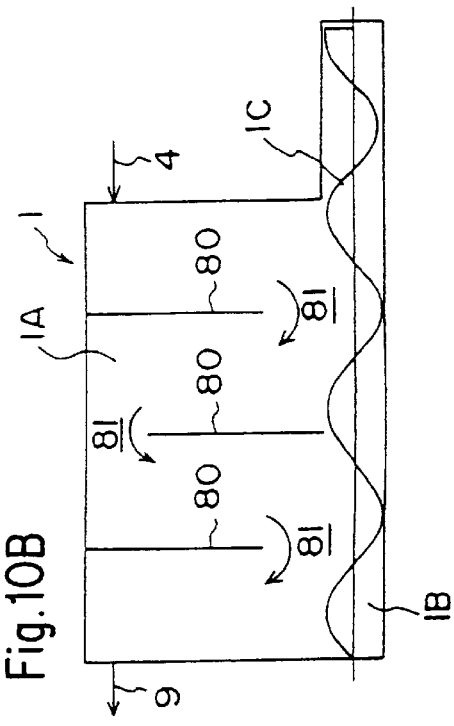

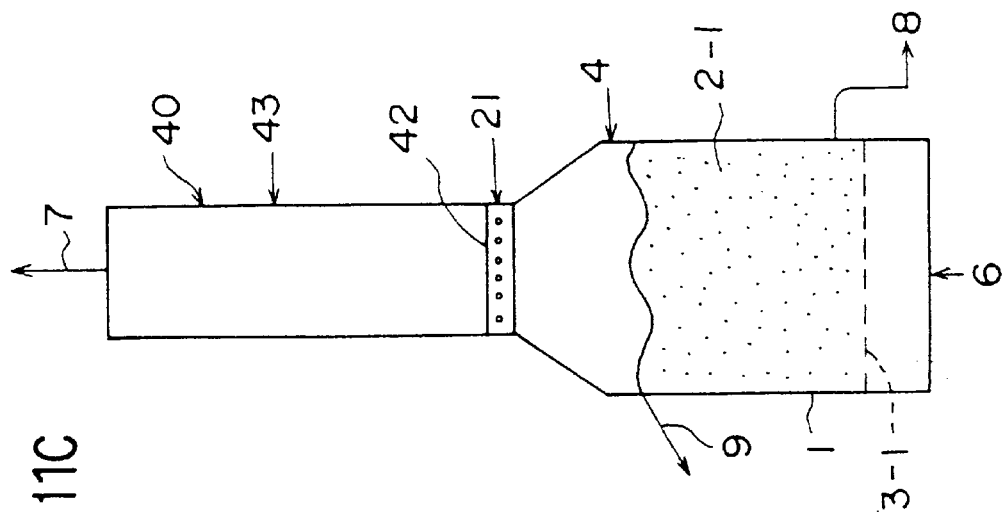
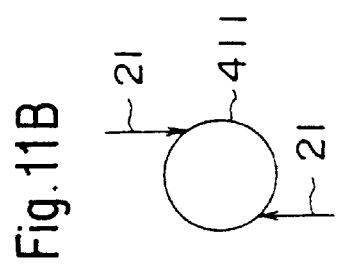
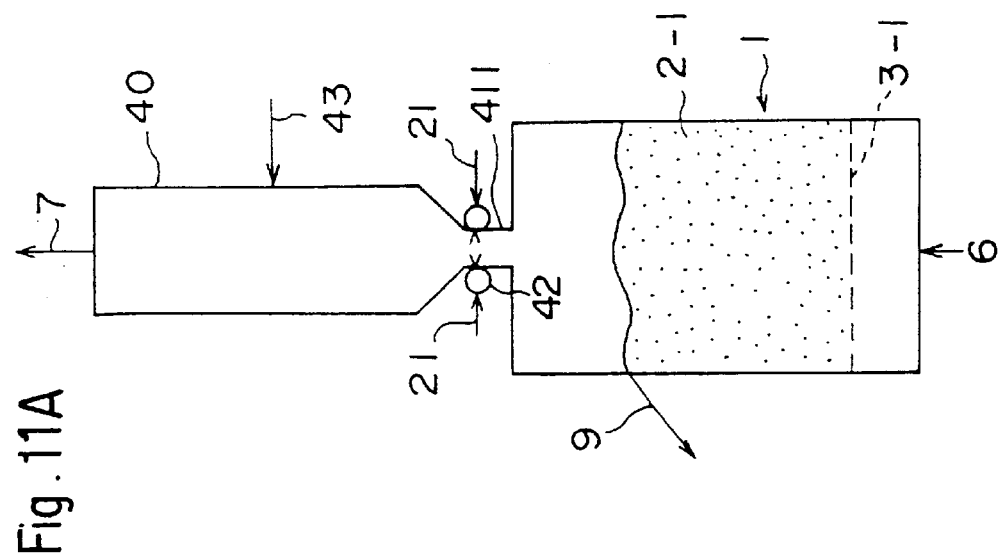

METHOD AND APPARATUS FOR PRODUCING SUPERHEATED STEAM USING HEAT FROM THE INCINERATION OF WASTE MATERIAL

This application is a 371 of PCT/JP97/00573, filed Feb. 27, 1997.

TECHNICAL FIELD

This invention concerns a superheated steam generator which employs incinerating municipal garbage or industrial waste, and produces superheated steam with the heat energy from such an incineration. The superheated steam produced by this apparatus might, for example, be used for an electric power plant. The heat energy of the incineration can also be used to melt the ash resulting from incineration so that it can be used again as a resource.

TECHNICAL BACKGROUND

In the prior art, apparatuses to incinerate waste such as municipal garbage have frequently employed fluidized beds. Such apparatuses blow air or the exhaust gas from incineration into the fluidized bed medium, which may be sand, from below a dispersion plate (e.g., a perforated plate) in the furnace onto which the sand is supplied. The material is heated and thereby fluidized. Waste such as municipal garbage is fed into the fluidized bed formed in this way and combusted.

The gases generated by this incineration are exhausted through a discharge line and enter a boiler. In the boiler, steam is produced through thermal contact with heated water.

The steam is used as the drive source for a turbine in an electrical plant.

Organic compounds such as vinyl chloride plastics are a component of waste material such as municipal garbage. The combustible portion contains approximately 0.2–0.5% Cl. When combusted, chlorides contained in the vinyl chloride plastics mixed in with waste material such as municipal garbage are converted to HCl. (Normally, the HCl content of the exhaust gas from the incineration of garbage is in the range of 500–1,000 ppm.) This HCl acts on the tubes in the boiler used to produce steam which is placed at the exit of the incinerator and corrodes them. At temperatures above 350° C., as the surface temperature of the tubes increases, the corrosion becomes extremely serious.

It was thus necessary in prior art incinerators to keep the temperature of the tube surfaces below 350° C. This limited the temperature of the steam which could be produced to approximately 300° C. As a result, the generating efficiency of prior art garbage incinerators was below 15%. In contrast, fuels such as heavy oil or LNG (liquified natural gas) are virtually free of chlorine compounds. Boiler tubes in plants which burn these fuels can withstand temperatures of 500–600° C., yielding an efficiency of 40%. Because of their poor efficiency, there has been a strong demand for the improvement of waste incinerators.

DISCLOSURE OF THE INVENTION

This invention was developed in consideration of these technical problems. The object of this invention is to provide a method and an apparatus to efficiently produce superheated steam at high temperatures and under high pressure without the corrosion of the boiler tubes caused by chlorine compounds.

Another object of this invention to provide a method and an apparatus to produce superheated steam which can efficiently reduce the chlorine and produce superheated steam at high temperatures without using an expensive, high-quality substance for the boiler tubes.

Another object of this invention is to provide a method and an apparatus to produce superheated steam which could efficiently combust char and pyrolyze it in apparatuses for those purposes, and which can efficiently reduce the chlorine and produce superheated steam at high temperatures.

Yet another object of this invention is to provide a method and an apparatus to produce superheated steam which can efficiently combust mixtures containing char.

Yet another object of this invention is to provide a method and an apparatus to produce superheated steam which can efficiently pyrolyze char in a char pyrolyzing device, prevent tars from adhering to the pipes, prevent coking, and reduce the quantity of dioxins and NOx released, while efficiently reducing the chlorine and producing superheated steam at high temperatures.

Yet another object of this invention is to provide a method and an apparatus to produce superheated steam which can continue generating steam in a stable fashion over a long period of time, and which can use the pyrolysis gases more efficiently.

A further object of this invention is to provide a method and an apparatus to produce superheated steam which can melt ash separated from the pyrolysis or combustion gases in order to form an aggregate or some similar substance.

Configuration

To address these problems, we designed this invention to have the following distinguishing features. The water in the boiler is pressurized to such a degree that its boiling point is in the range of 200° C. to 320° C. This water is heated in at least two stages.

Up to the boiling point, the water is heated with thermal energy from gases containing chlorine.

After it reaches its boiling point, the water is heated to obtain superheated steam of a specified temperature with thermal energy from gases from which chlorides have been removed.

The effects of this invention can be seen in FIG. 3. Even if chlorine-rich gases resulting from the pyrolysis of waste such as municipal garbage contain acids such as HCl, the thermal energy of these gases will be used only to heat the water to its boiling point, approximately 200° C. to 320° C. Although the chlorine-rich pyrolysis gases are used in the boiler tubes which produce steam, the surface temperature of the tubes does not exceed 350° C.; hence these gases do not corrode the tubes.

In this case, pressure is used to set the boiling point of the water to somewhere between 200° C. and 320° C. Even if there is variation in the rate of transfer of the thermal energy of the chlorine-rich pyrolysis gases to the water in the boiler, this variation can be used to absorb the latent heat of the water. (In other words, it is used only to change the water from liquid to steam, but not to raise its temperature.) The surface temperature of the heat-exchange tubes in the boiler does not exceed the point at which chlorine corrosion begins. With this design, then, the temperature of the water or the steam can be increased in a stable fashion.

Unpyrolyzed residues which are not thermally decomposed in the pyrolysis occurring at 300° C. to 500° C. have already been dechlorinated. Thus the thermal energy corresponding approximately to 500–950° C. generated by combusting these residues can be used for the secondary or tertiary heating where the water or steam of 200–320° C. in the primary heating is further heated to 400–500° C. to produce the superheated steam (so that the temperature of the boiler tubes is approximately 450–550° C.). No corrosion will occur under these circumstances, even in tubes formed from common, inexpensive materials.

When a boiler of this design is used to generate electricity through the incineration of garbage, it will result in a generating efficiency of 30–40%. This is equal to the efficiency of a plant which burns fuels such as heavy oil or LNG, which are substantially free of chlorine compounds.

In the actual systems, the garbage is heated by means of the chlorine-containing energy source as follows. Waste is supplied into a chamber containing a fluidized bed medium which has been heated to at least approximately 300° C. Thermal energy is freed by combusting the pyrolysis gases obtained in the pyrolysis means (pyrolysis furnace) which induces the pyrolytic reaction. This energy is used to heat the water. For the chlorine-free energy source, the mixture of char, which consists of the unpyrolyzed residue, and sand removed from the pyrolysis furnace is fluidized by air, and the unpyrolyzed residue is combusted by the char combustion furnace. The thermal energy freed in this way is used further to heat the water.

The apparatus which realizes the invention described above primarily comprises the following components:

A pyrolysis means which supplies waste to a chamber heated to at least 300° C., preferably between 350° C. and 500° C. A pyrolytic reaction is induced, and the gases generated by the reaction, the char mixture consisting of unpyrolyzed residue and the fluidized bed medium, and the uncombusted materials are separated from each other by a fluidized bed, a rotary kiln or a mechanical agitation tank.

A char combustion means to combust char comprising a fluidized bed suspended in a gas stream, a rapidly circulating fluidized bed, or some other type of fluidized bed which uses air to fluidize the char mixture of unpyrolyzed residue and fluidized bed medium and to combust the char.

A first steam generating means to produce steam which uses the thermal energy of the pyrolysis gases to produce hot water or steam of a temperature under 400° C., more specifically, of a temperature under approximately 200–350° C.

A second steam generating means to produce steam which converts the hot water or steam produced by the first steam generating means into superheated steam using the heat of the combustion gases obtained by the char combustion means to combust char.

In this case, it is desirable that a portion of the steam heated by either the first or the second steam generating means or a portion of the hot water or steam introduced into either of the steam generating means be conducted as appropriate to a heat exchanger arranged on the high-temperature side of the char combustion means to combust char.

It is also desirable to provide an auxiliary char combustion means to combust char somewhere along the circulation path used by the fluidized bed medium heated by the char combustion means to combust char, and preferably on the path along which the fluidized bed medium travels to return to the pyrolysis means. A heat exchanger should be provided in the combustion medium in the auxiliary char combustion means to raise the temperature of the steam heated by the heat exchange means arranged on the high-temperature side of either the first or the second steam generating means or of the char combustion means.

More specifically, it is desirable to provide, on the path along which the fluidized bed medium heated by the char combustion means returns to the pyrolysis means, an auxiliary means to combust char which has a heat exchanging means or other device to mitigate thermal drop.

To effectively remove uncombusted material from the pyrolysis and char combustion means according to this invention, the following components should be provided:

A first filtering means which separates any large chunks of uncombusted matter from other material exiting through the discharge port for uncombusted materials on the pyrolysis means and which sends the other material to the bottom of the char combustion means.

A second filtering means which separates the fluidized bed medium from the finer uncombusted matter exiting through the discharge port for uncombusted materials on the char combustion means and which sends the fluidized bed medium to the bottom of the char combustion means.

A third filtering means which, if necessary, separates the ash on the discharge side of the second filtering means and sends the fluidized bed medium, now separated from the ash, to the bottom of the char combustion means.

The first filtering means must at least have larger openings than the second filtering means. More specifically, the first filtering means should have openings approximately 5 mm larger than the scraps of waste which are loaded, and the second filtering means should have openings approximately 2 mm larger than the maximum diameter (approximately 1.0 mm) of the fluidized bed medium. The third filtering means should have openings approximately 0.1 mm smaller than the minimum diameter of the fluidized bed medium. Vibrating screens may be used in the filtering means.

With this invention, the char mixture separated by the pyrolysis means contains essentially no chlorides. Thus no high-temperature corrosion will occur when this mixture is used as a heat source by the second steam generating means in order to produce superheated steam with a temperature over 500° C.

The exhaust gas from combusting pyrolysis gases containing chlorides is used as a heat source in the first steam generating means; however, this heat source is used only to produce hot water or steam below 400° C., more specifically, no hotter than about 200° C. to 320° C. The water, then, is not heated to the point at which high-temperature corrosion occurs. There is no danger of corrosion in the boiler tubes, and expensive, high-quality materials are not required.

With this invention, a portion of the steam heated by either the first or second steam generating means or a portion of the hot water or steam conducted into either of the steam generating means may, at the user's discretion, be conducted into a heat exchanger (hereafter called the first heat exchange means) arranged in the high temperature region of the char combustion means. In the char combustion means, the char mixture is fluidized by means of air and the unpyrolyzed residue is combusted. The combustion gases reach temperatures which are quite high, specifically, in the range of 700° C. to 950° C.

The thermal energy of these gases can be used to exchange heat with a portion of the steam heated by either the first or the second steam generating means, or with a portion of the hot water or steam led into either of the generating means. This will achieve the action shortly to be described.

The hot water fed to the first steam generating means is conducted into the heat exchange means so that its temperature is raised somewhat. The hot water or steam fed to the second steam generating means can be conducted in parallel into the heat exchange means, just as with the first steam generating means. In this way the heating capacity of the second steam generating means can be boosted, so that a larger quantity of superheated steam can be produced.

The high-temperature region of the char combustion means reaches temperatures in the range of 800–950° C. When the superheated steam produced in the second steam generation means is fed into the heat exchange means, its temperature can be boosted to 400° C. to 520° C., yielding an even hotter steam.

The first and second steam generating means and the first heat exchange means, then, can be used sequentially or in parallel to heat the boiler water in multiple stages. This arrangement will yield a large quantity of superheated steam.

Without intervention, the high-temperature region of the char combustion means would reach temperatures in the range of 950–1,300° C. If the char were allowed to flow untreated into a discharge line made of common refractory materials, the line would not be able to sustain withstand the heat. Installing a heat exchange means in the high-temperature region lowers its temperature to 800–950° C. and allows common refractory materials to be used for the discharge line. Lowering the temperature of the region to 800–950° C. as described above does not affect the ability of the second steam generating means to maintain the temperature of the steam at 400–520° C.

The fluidized bed medium heated by the char combustion means also attains a high temperature. According to this invention, the thermal energy of this heated fluidized bed medium can be used if an auxiliary char combustion means is installed on the path along which the fluidized bed medium heated by the first char combustion means circulates. A heat exchange means can be provided in the fluidized bed medium in this auxiliary combustion means on the side of either the first or the second steam generating means.

Thus heat exchange means can be installed in series or in parallel in the first and second steam generating means to achieve multistage heating. This arrangement will increase the thermal capacity of the fluidized bed medium so that the water can attain a stable high temperature through thermal contact with the fluidized bed medium.

The fluidized bed medium in the char combustion means is recirculated to the pyrolysis means. However, the temperature of the fluidized bed medium in the char combustion means is approximately 700–850° C., while that of the fluidized bed medium in the pyrolysis means is 350–500° C. If the considerably hotter fluidized bed medium from the char combustion means is introduced directly into the pyrolysis means, the temperature within that pyrolysis means will have local spikes due to the differential and the temperature may fluctuate. Controlling the volume of the fluidized bed medium which is to be recirculated is thus an extremely complex problem.

According to this invention, then, an auxiliary char combustion means equipped with a thermal mitigation means such as a heat exchange means to mitigate thermal drop can be placed on the path along which the fluidized bed medium heated in the char combustion means travels on its return to the pyrolysis means.

The temperature of the fluidized bed medium, which has been heated to 700–850° C. in the char combustion means, is lowered by the heat exchange means in the auxiliary char combustion means to 500–700° C. When this fluidized bed medium, now at 500–700° C., is returned to the pyrolysis means, a gentle thermal slope results. As a result, the temperature in the pyrolysis means can be kept stable in the range of 350° C. to 500° C.

With this invention, the waste fed into the pyrolysis means is generally in scraps approximately 200 mm in diameter. Thus the discharge port for uncombusted materials in the fluidized bed furnace which serves as the pyrolysis means must have a diameter slightly larger than 200 mm. Consequently, some of the char residue and sand or other fluidized bed medium will also be removed through the discharge port.

This is why the large chunks of uncombusted material are separated from other matter exiting through the discharge port by the first filtering means. Only the large chunks are separated, while the remaining uncombusted material is supplied to the bottom of the combustion means where it can contribute to combustion.

Since the larger chunks of uncombusted material have already been removed from the char combustion means and the char residue has been sufficiently combusted, the material exiting through the discharge port need only be separated by the second filtering means into finer uncombusted material and fluidized bed medium. The fluidized bed medium separated by this filtering means can be supplied to the bottom of the combustion means so that instead of being lost it can be circulated and used again.

The third filtering means is not absolutely necessary. However, it can catch the sand not caught by the second filtering means while allowing only the ash to pass to the exterior. Use of a third filtering means makes it easier to remove the ash efficiently and recover the sand.

With this invention, if the plastic is to be completely pyrolyzed in the pyrolysis means and the char completely combusted in the combustion means, it is crucial that the volume of combustion gas exhausted, the volume of air supplied, the volume of bed medium and waste fed and circulated, the temperature and the residence times for pyrolysis and combustion all be rigorously controlled. For this reason it is not possible to prevent a pressure differential from occurring between the fluidizing tank where the pyrolysis occurs and the reactor where the char is combusted.

There is communication between the two fluidizing tanks. The char mixture comprising unpyrolyzed residue and fluidized bed medium is supplied (i.e., returned) from the pyrolysis means to the char combustion means; the hot fluidized bed medium is returned from the combustion means back to the pyrolysis means.

The temperature within the pyrolysis means is 350–500° C.; that within the char combustion means is 700–850° C. Given this temperature differential, circulating a fluidized bed medium with a high thermal capacity from one means to the other and then back again will cause the temperature in both means to fluctuate with the volume of fluidized bed medium circulated. As a result, incomplete pyrolysis may occur in the pyrolysis means and incomplete combustion may occur in the combustion means.

With this invention, the water in the boiler is heated to approximately its boiling point using the thermal energy of gases containing chlorine compounds obtained from the pyrolysis means, and it is heated from its boiling point until it is superheated steam of a given temperature using the thermal energy of dechlorinated gases obtained from the char combustion means. The calorie ratio of the thermal energy of the pyrolysis gases obtained from the pyrolysis means vs. the thermal energy of the dechlorinated gases obtained from the char combustion means should be set at 7:3. However, because of backflow of the fluidized bed medium as discussed above, the calorie ratio cannot be maintained.

According to this invention, a backflow preventive means to prevent backflow of char or fluidized bed medium is provided either along the path traveled by the char between the pyrolysis means and the combustion means or, alternatively, in the pyrolysis means and/or in the combustion means.

This backflow preventive means may be a device which creates a pressure differential, or it may be a mechanical conveyor.

The backflow preventive means might, for example, comprise at least one device to create a pressure differential in the combustion means which returns the fluidized bed medium to the pyrolysis means. The device should create a pressure differential larger than the differential ($P_1-P_2$) between the pressure $P_1$ in the pyrolysis means and the pressure $P_2$ in the char combustion means.

Another possible design for the backflow preventive means would be to use a mechanical conveyor to feed the char by force to either the pyrolysis means or the char combustion means. Advantageously, the path from the entry port of the mechanical conveyor to its discharge port should be slanted upward to create a gravity differential.

According to this invention, a thermal mitigation means to mitigate thermal drop such as a heat exchanging means should be provided on the path traveled by the heated fluidized bed medium as it returns from the char combustion means to the pyrolysis means. Preferably, a heat exchanging means should be provided in the auxiliary char combustion means, and a backflow preventive means to prevent backflow as described above should be provided at the discharge port of the means in which the heat exchanging means is installed.

According to this invention, a backflow preventive means to prevent backflow of either char or fluidized bed medium is provided between the pyrolysis and char combustion means so that fluidized bed medium with a temperature differential as described above and a large thermal capacity cannot accidentally flow back to either of the fluidizing tanks. This design will prevent backflow from causing temperature fluctuations or adversely affecting the conditions required for pyrolysis and combustion in either tank.

Furthermore, the flowing action which is the objective in both the pyrolysis means and the char combustion means is made to occur smoothly by this design. The desired calorie ratio of the thermal energy of the pyrolysis gases obtained in the pyrolysis means vs. that of the chlorine-free combustion gases obtained in the char combustion means (the chlorine-free thermal energy) can be achieved without variation, and there will be no chlorides mixed in with the char combustion gases.

A pressure differential generating means is provided to generate a pressure differential (H) which is greater than the differential ($P_1-P_2$) between the pressure $P_1$ in the pyrolysis means and the pressure $P_2$ in the char combustion means. When the pressure $P_1$ in the pyrolysis means falls below a given value or the pressure $P_2$ in the char combustion means exceeds a given value, pressure can be supplied automatically until a given pressure differential (H) is obtained. As a result, the relative pressure differential between the char combustion means and the pyrolysis means can be maintained very close to the given value (H), which is the desired value.

According to this invention, the char combustion means is also disclosed as follows.

In the combustion means, either the air supplied from below the dispersion plate (hereafter called the air flow) is divided into two streams or the interior of the said fluidized bed is divided by a partition panel. This creates a fluidizing tank which fluidizes and circulates the char mixture in the fluidized bed. A supply port which delivers the mixture of char from the pyrolysis means is located in either the downward-flowing region of the fluidized bed or the lower portion of the upward-flowing region.

The circulation means may comprises a number of units to assure that the material circulates all around the fluidized bed, or it may comprise a device which divides the air flow supplied from below the dispersion plate into multiple streams. The multiple air streams may be used to control the volume of air so that the char mixture circulates in the fluidized bed, or both systems may be used in tandem.

The char combustion means operates as follows.

Since most of the pyrolyzed char is in the form of carbon, its density (i.e., its specific gravity) will be in the range of 0.2 to 0.5. Because the specific gravity of the fluidized sand in the combustion means is approximately 2.5, the char will tend to float in the upper part of the bed. If the admixture of air is insufficient, the char will be less flammable. Hence a large quantity of air is required.

According to this invention, the supply port for the char mixture from the pyrolysis means is located in the downward flowing region of the fluidized bed. The relatively light char moves without fail to the bottom of the fluidized bed and is circulated from there. This insures that the char will be sufficiently mixed with air and that sufficient combustion can occur with a relatively small air flow (for example, air ratio=(air volume/theoretical air volume)=1.2 to 1.3).

The char which floats to the surface of the fluidized bed is also returned by way of the downward flowing region and transported to the bottom of the fluidized bed. This increases the effect discussed above.

To combust the pyrolysis gases, air is introduced into the upper space of the fluidized bed furnace constituting the pyrolysis means in a process which may entail a single stage or multiple stages. This prevents temperature drops in the discharge line. Since it also prevents extreme temperature spikes, this design prevents tarring and coking and enables the system to operate in a stable fashion.

With this invention, air may be introduced into the pyrolysis gases after they have undergone primary combustion, and the reduced pyrolysis gases may be burned to decrease the volume of NOx generated.

When the heat of the second combustion in the upper space of the furnace radiates into the fluidized bed occupying the lower space of the furnace, the char will combust and acceptable pyrolysis will not occur. With this invention, the middle space between the upper and lower spaces of the furnace is narrowed to promote the mixture of air into the gases and to prevent the backflow of the radiant heat.

When the pyrolysis means comprises a fluidized bed, the fluidized bed should have two parts: a primary fluidized bed, in which the sand or other fluidized bed medium is fluidized by blowing air or the exhaust gas of combustion from beneath the dispersion plate on which the material is supplied; and a conveyor means to convey the waste material. The walls below the primary fluidized bed become wider, and a conveyor mean on the bottom of the chamber conveys the solid portion of the waste material from its entry port to the discharge port where the char mixture is removed.

With this invention, the conveyor means functions as an auxiliary pyrolysis unit where uncombustible matter is conveyed by force toward the char residue while pyrolysis is induced. This insures that there is no material left among the uncombustible material which has never been pyrolyzed. All chlorides in the waste material are completely pyrolyzed, vaporized and removed.

For the length of flow of the actual fluidized bed which is produced by the partition panels within the bed, more specifically the length of flow over which the waste material and the fluidized bed medium are mixed and forced toward the discharge port for the char mixture, many options are possible. However, the pyrolytic reaction should be sustained uniformly over a given period of time so that waste material does not end up being blown intact all the way to the discharge port for the char mixture. The configuration described above allows the pyrolytic reaction to occur uniformly and for a sufficient period of time for any chlorides in the waste material to be fully pyrolyzed, vaporized and removed.

According to this invention, an ash sludge separation means is provided between the pyrolysis means and the first steam generating means to extract the sludge from the ash. This ash sludge separation means extracts the sludge from the ash which was separated from the gases forced out of either the char combustion means or the pyrolysis means by the heat of the primary combustion of the pyrolysis gases. Desirably, a secondary pyrolysis gases combustion means could be provided to carry out secondary combustion of the pyrolysis gases from which the ash has been separated.

The ash sludge separated by the ash-sludge separating means may be used to form an aggregate after the gas is separated or while it is being separated.

The pyrolysis gases can be used to induce secondary pyrolysis gas combustion. The boiler or other device used as the first steam generating means can be installed inside the secondary pyrolysis gas combustion means. This will allow the boiler water to be heated more efficiently.

The ash contained in the pyrolysis gases and that contained in the combustion gases represents approximately ten percent of the waste material. Thus it is not absolutely necessary to use all the pyrolysis gases which supply the ash to melt the ash. In fact, this might result in the production of excess thermal energy.

When low-calorie garbage is being burned, a great deal of oxygen-enriched air will be needed to generate high-temperature combustion of the pyrolysis gases before the ash can be melted.

Therefore, instead of supplying all the pyrolysis gases obtained in the pyrolysis means to the ash sludge separation means, it is advisable to send a portion of these gases via a branching line to the secondary pyrolysis gas combustion means.

According to this invention, it would be advantageous to supply the waste material to an oxygen-poor chamber with a temperature in excess of 300° C. and induce a pyrolytic reaction. A portion of the discharge line to supply the pyrolysis gases generated by this reaction to the secondary pyrolysis gas combustion means or to a heat exchanging means, can be narrowed, and a pressure vent can be provided where the narrow portion begins and ends to admit a small volume of air as needed.

These configurations are needed for the following reasons.

In a device having the ash sludge separation means, differential pressure gages such as orifices must be installed along the route traveled by the pyrolysis gases, and the volume of flow (or speed of flow) must be measured in order to control the flow of pyrolysis gases necessary to melt the ash, as discussed above.

This is why differential pressure gauges such as orifices (narrow portions) must be provided along the discharge route from the pyrolysis means to measure the volume of flow. However, since the temperature of the exhaust gas from the pyrolysis means is in the neighborhood of 350° C. to 500° C., some of the gases being discharged may contain tars. These tars will adhere to the narrowed portion or pressure taps (tiny pressure vents), making it difficult to measure the volume of flow.

According to this invention, an air ventilation means to input a small quantity of air is provided (the word "air" here means any kind of gases to support combustion) as needed at the pressure vents installed on both sides of the narrow portion. This air causes the tars to combust so that they cannot adhere to the vents, allowing the pressure to be measured in a stable fashion.

It would also be possible to return a portion of the pyrolysis gases obtained in the pyrolysis means to the entry port of the same means.

This arrangement, in which a portion of the pyrolysis gases obtained in the pyrolysis means are supplied to the entry port of the same means, means that combustible gases whose temperatures range from 350° C. to 500° C. are circulated and supplied to the pyrolysis means. Dilution of the pyrolysis gases with inert gases such as $N_2$, $CO_2$ or $H_2O$ from the air or from the exhaust gases of combustion is kept to a minimum. Thus the heat value per unit volume is maximized, and it is easier to maintain the temperature in the ash-melting furnace and in the ash-sludge separation means.

The pyrolysis means is not limited to a fluidized bed. It can instead comprise a pyrolysis kiln capable of agitating the solid matter in the pyrolysis means as it is mechanically conveyed from the entry port for waste material to the discharge port for the char mixture.

If, as described above, the pyrolysis means is not a fluidized bed, but comprises a mechanical conveyor/agitator, the duration and volume of pyrolysis can be controlled, so the pyrolysis is more stable than in a fluidized bed.

An important effect of using a mechanical conveyor is that it does not require the gases needed to fluidize a fluidized bed (primarily inert gases whose main components are $N_2$, $CO_2$ and $H_2O$). The pyrolysis gases are not diluted, so the heat value per unit volume is greater. Temperatures in excess of 1,300° C. can be generated easily by infusing air or oxygen-enriched air, and these temperatures can be used effectively as the energy source to melt the ash in the gases, as will be described shortly.

Since the combustion gases are exhausted from the char combustion means with their ash content, it is advisable that they be separated in a cyclone or the like before being conducted to the superheater, boiler, or other steam generating means.

The ash which has been separated from the gases can be melted and granulated so that it can be used in an aggregate.

The ash can easily be melted by combusting it at a temperature greater than 1,300° C. by the pyrolysis gases.

However, the ash contained in the pyrolysis gases and that contained in the combustion gases represents approximately ten percent of the waste material. Thus it is not absolutely necessary to melt the ash in all the pyrolysis gases which supply it. In fact, this might result in the supply of excess thermal energy.

To melt the ash in all the pyrolysis gases,. a great deal of oxygen-enriched air would be needed to generate high-temperature combustion.

The essential objective of the pyrolysis means is simply to remove the chlorine compounds from the garbage or other waste material and supply the dechlorinated char mixture to the char combustion means. There is thus no actual need to generate extreme heat, and the temperatures in the range of 250° C. to 450° C. will suffice. However, a temperature of about 1,300° C. is needed to melt the ash in the ash-melting furnace. For this reason, the pyrolysis gases which are to be used in the ash-melting furnace need to be hotter. Ideally, pyrolysis should be induced at 450° C. to 700° C. not only to dechlorinate the gases, but to generate a large volume of gases.

With this invention, therefore, the pyrolysis means may comprise a plurality of pyrolysis furnaces having a combination of a fluidized bed and a mechanical agitation tank in an appropriate fashion. One of these pyrolysis furnaces may induce pyrolysis at a different temperature than the others.

A low-temperature pyrolysis furnace may be set at 250–450° C. to generate dechlorinated char mixture. A high-temperature furnace may be set at 450–700° C. to generate pyrolysis gases to be used in the ash-melting furnace.

The pyrolysis gases generated by the high-temperature furnace would be supplied to the ash-sludge separation means which extracts the sludge from the ash separated from the gases removed from the char combustion means or the pyrolysis means.

The two types of pyrolysis furnaces can have separate functions. One furnace can be used to actively generate a dechlorinated char mixture; another can be used to actively generate pyrolysis gases to be used in the ash melting furnace. This separation of functions allows the char mixture to be generated efficiently while appropriate pyrolysis gases are generated.

If one of the furnaces serves solely to dechlorinate the waste materials, the fluidized bed can have a wider range of temperatures from 250° C. to 450° C., and consequently a large volume of char mixture can be generated.

A BRIEF DESCRIPTION OF THE DRAWINGS

Figure 4:
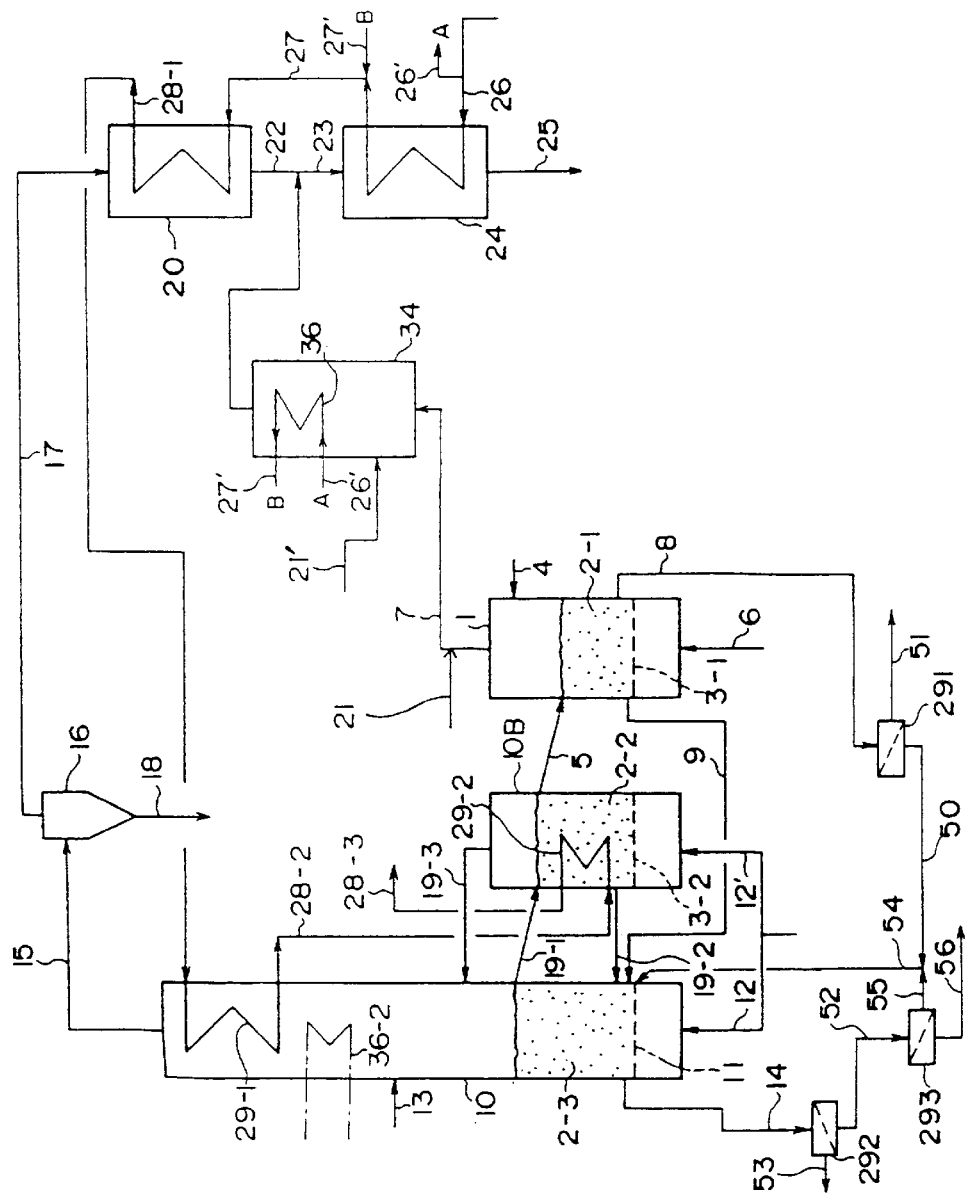
FIG. 4 illustrates an apparatus for producing superheated steam using the heat of combustion of waste materials, which system is a third preferred embodiment of this invention. In addition to the configuration shown in FIG. 1, filters for uncombusted matter are installed on the discharge lines leading out of the pyrolysis and char combustion furnaces.
Figure 5:
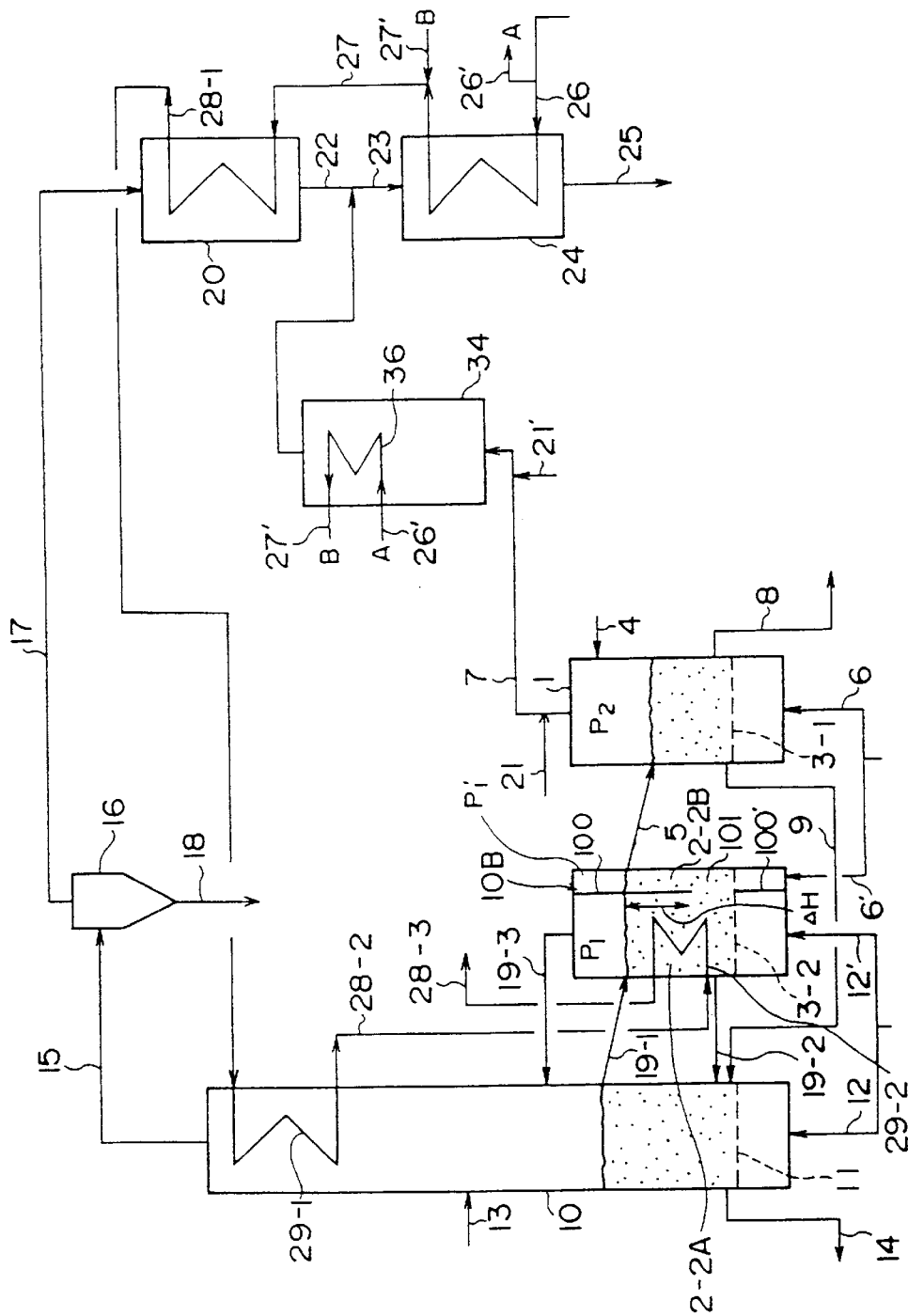

FIG. 5 illustrates an apparatus to produce superheated steam using the heat of combustion of waste materials, which system is fourth preferred embodiment of this invention. The auxiliary char combustion furnace shown in FIG. 4 is partitioned by a partition panel into two fluidized beds. This arrangement constitutes a backflow preventive means to prevent backflow.

Figure 6:
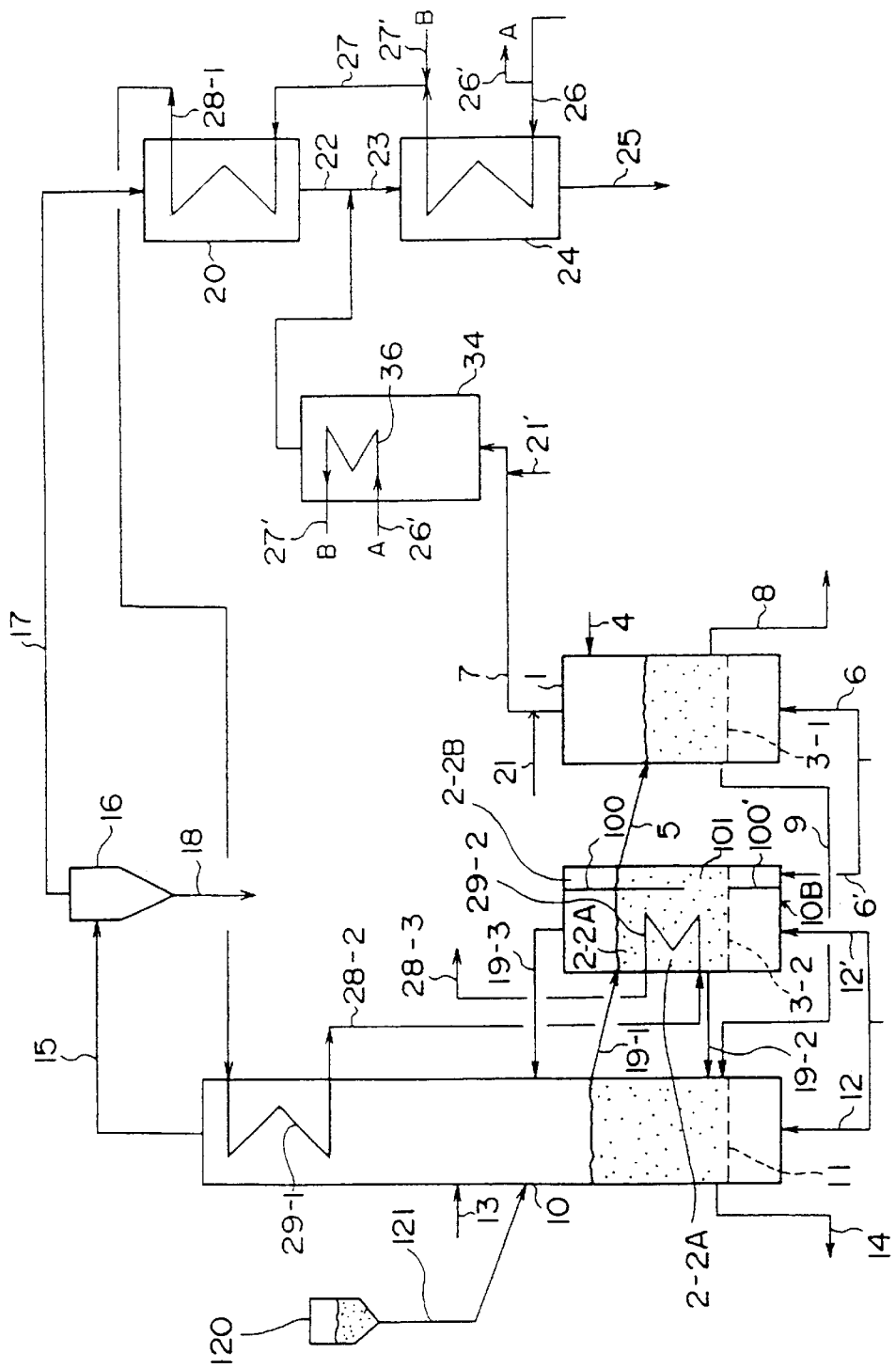

FIG. 6 illustrates an apparatus to produce superheated steam using the heat of combustion of waste materials, which system is a fifth preferred embodiment of this invention. In addition to the configuration shown in FIG. 5, this system has a sand storage means to supply sand from the storage tank to the char combustion furnace.

Figure 7:
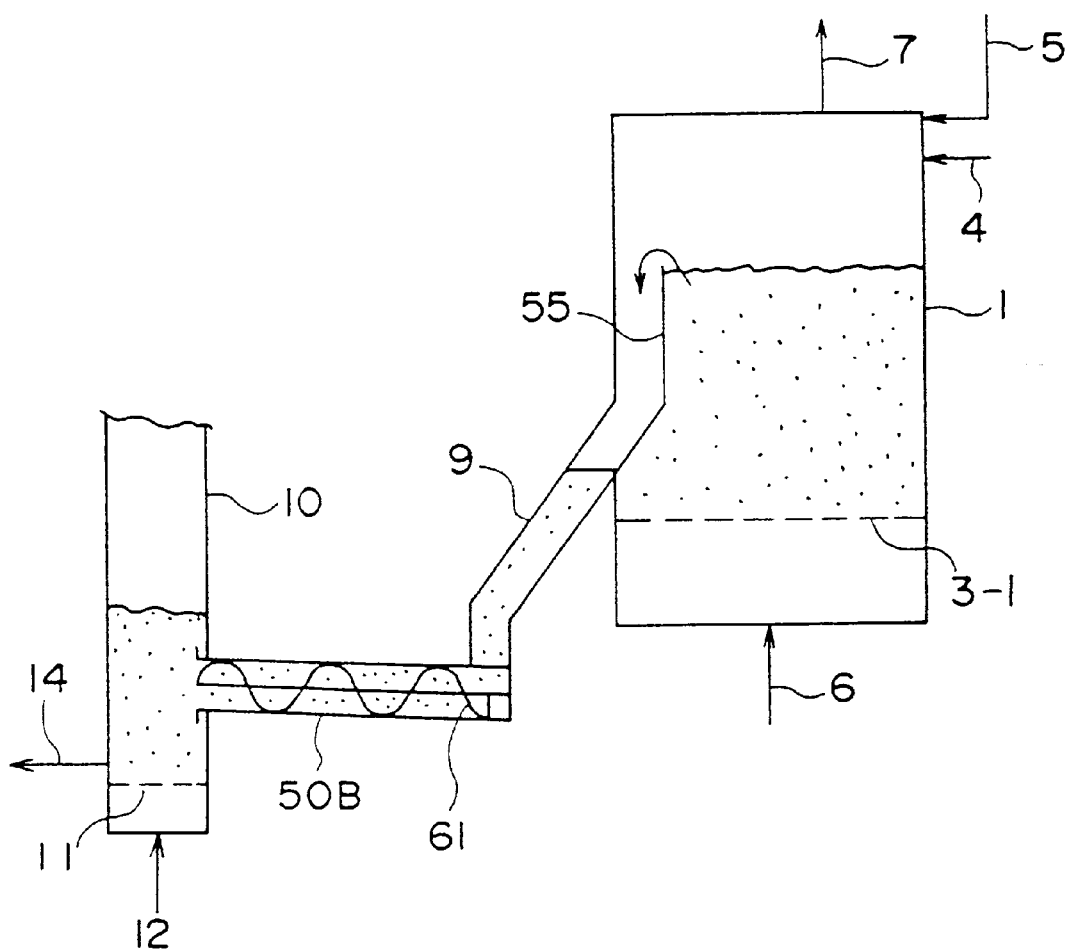

FIG. 7 is a rough sketch of a backflow prevention means. It comprises a mechanical conveyor which mechanically conveys the char from the pyrolysis means to the char combustion means.

Figure 8A:
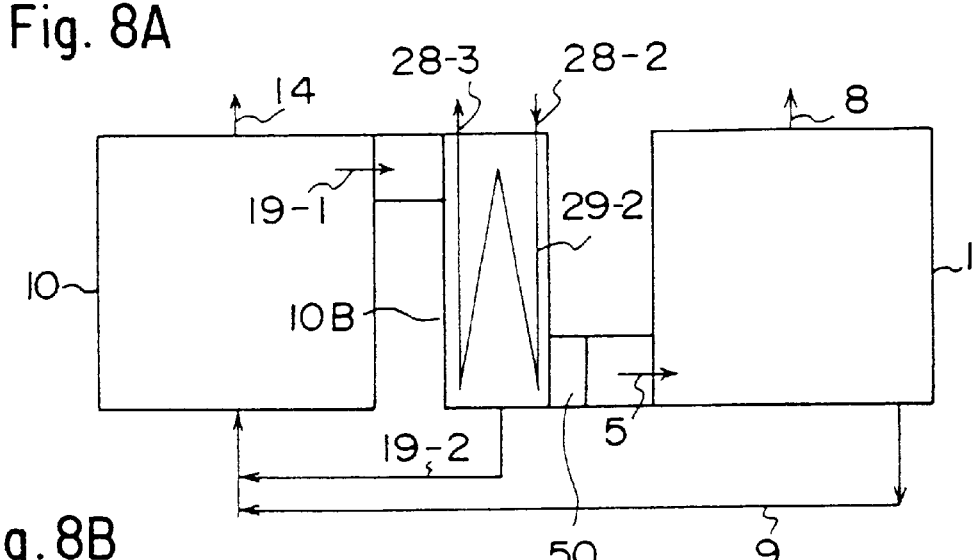
Figure 8B:
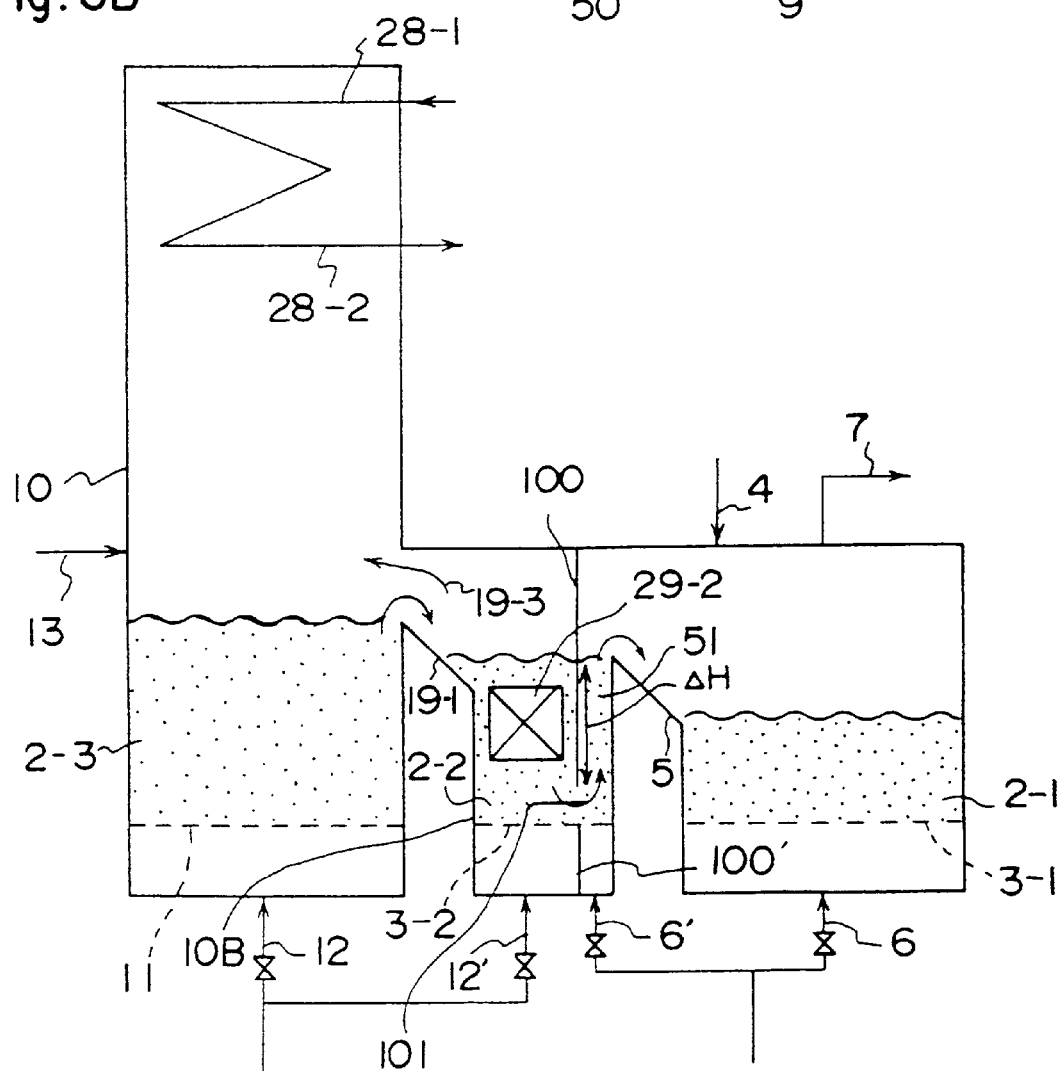

FIG. 8 shows main and auxiliary char combustion means and a pyrolysis furnace which might be used in the system shown in FIG. 5. (A) is a plan view and (B) is a front view.

Figure 9A:
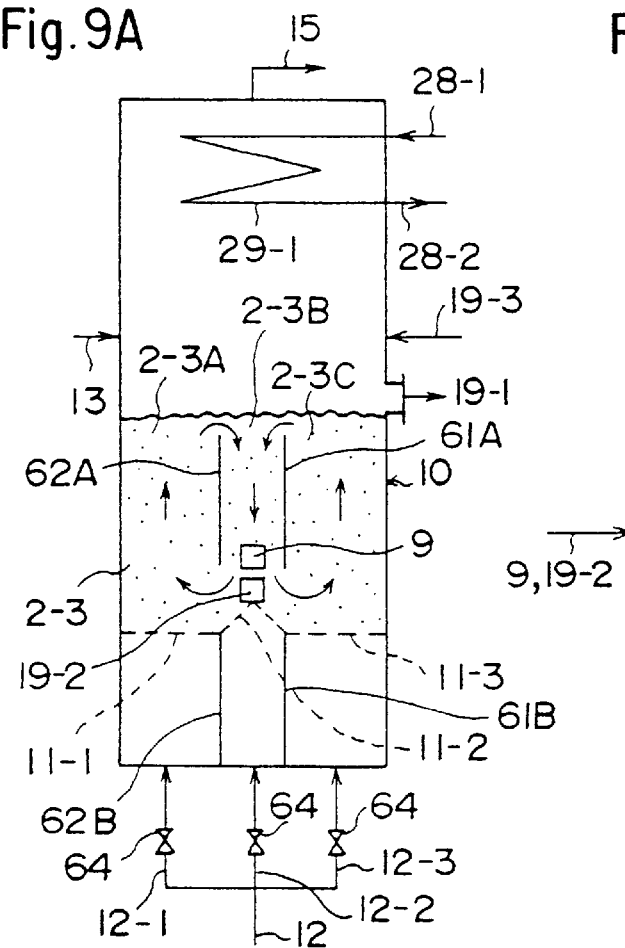
Figure 9B:
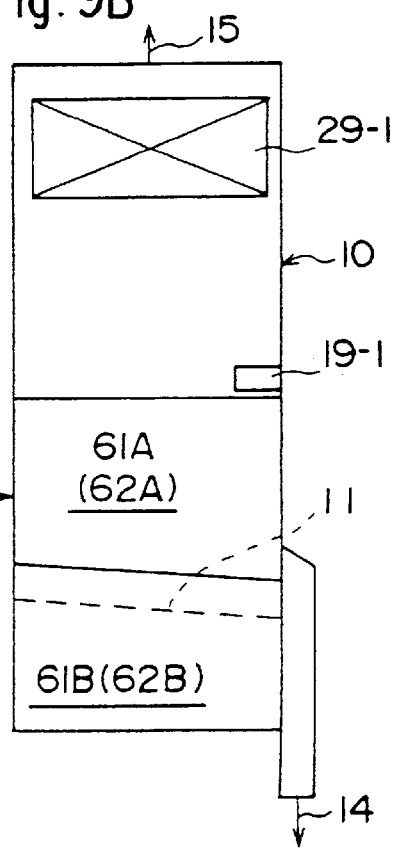
Figure 9C:
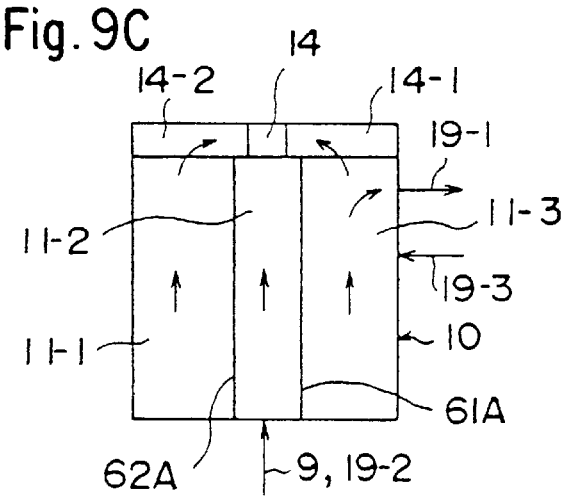

FIG. 9 shows the configuration of a fluidized bed which improves the char combustion furnace used in any of the embodiments previously described. (A) is a front view; (B) is a side view; (C) is a plan view.

FIG. 10 shows three views of the internal configuration of a pyrolysis furnace which is an improved version of the furnace used in any of the embodiments previously described. (A) is a front cross section; (B) is a planar cross section; (C) is a view from the right side.

FIG. 11 shows another improved version of a pyrolysis furnace connected to a pyrolysis gas combustion furnace to combust the pyrolysis gases. The pyrolysis gas combustion furnace comprises a duct shown in any of the previously described embodiments. (A) shows a side view of the pyrolysis furnace and combustion duct shown in FIG. 1; (B) shows a modification of the narrow portion; (C) is a front view.

Figure 2:
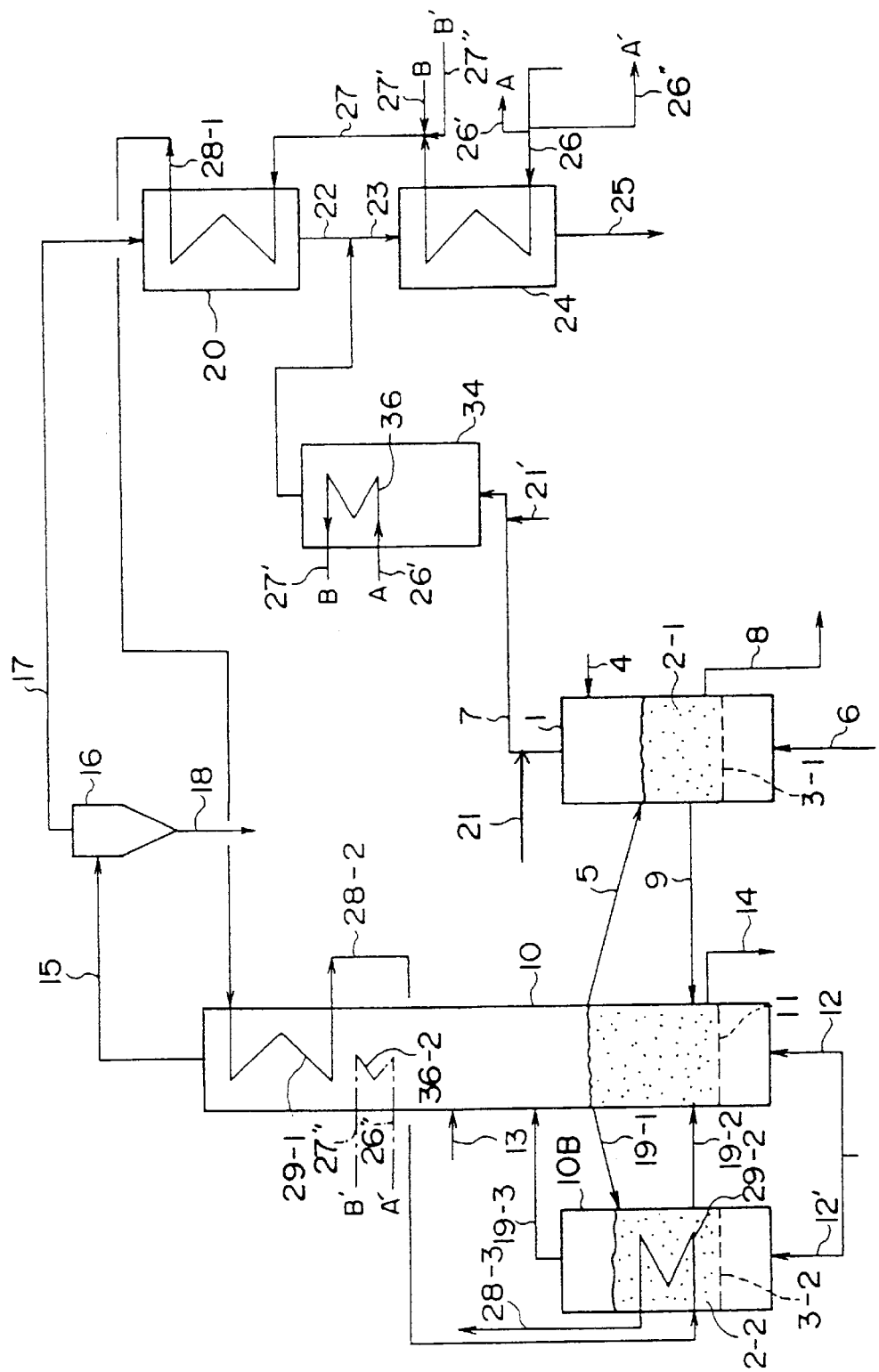
FIG. 2 illustrates an apparatus to produce superheated steam using the heat of combustion of waste materials, which system is a second preferred embodiment of this invention. An auxiliary char combustion furnace is independent of the other furnaces.
Figure 3:
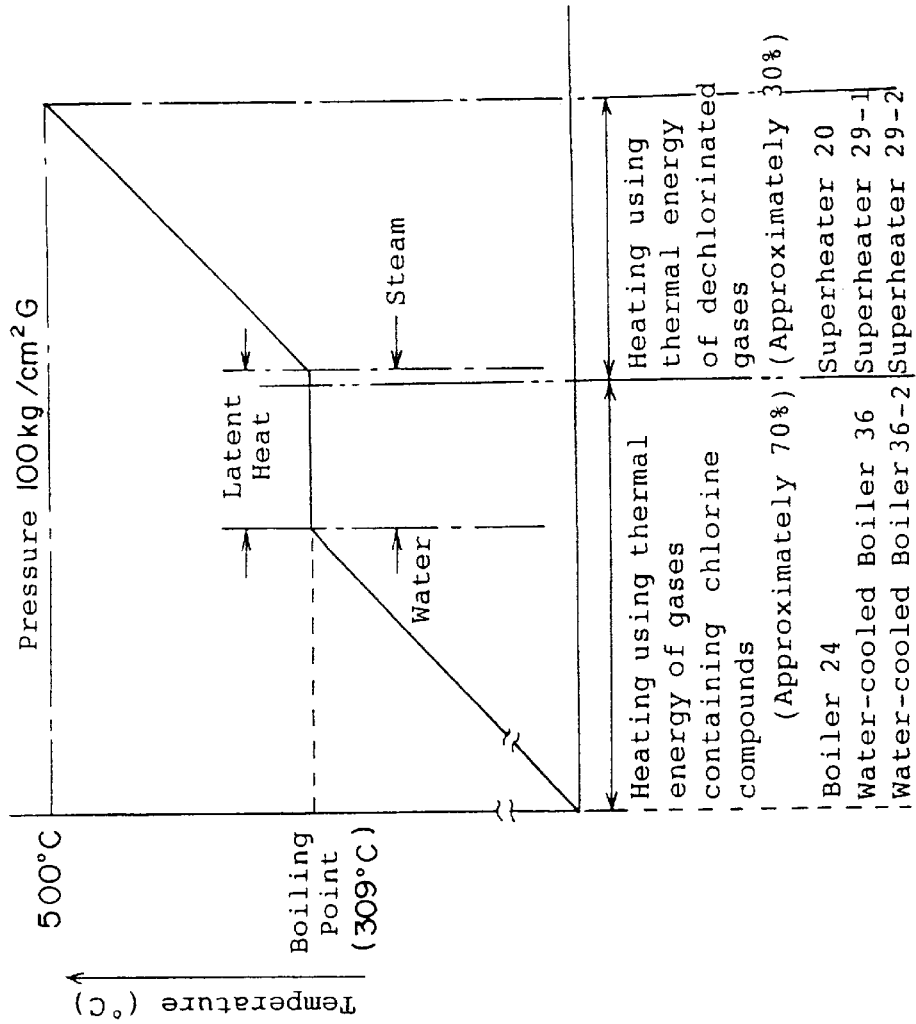
FIG. 3 is a graph illustrating the process by which superheated steam is produced using the heat of combustion of waste materials. This process relates directly to the essential configuration of this invention.
Figure 12:
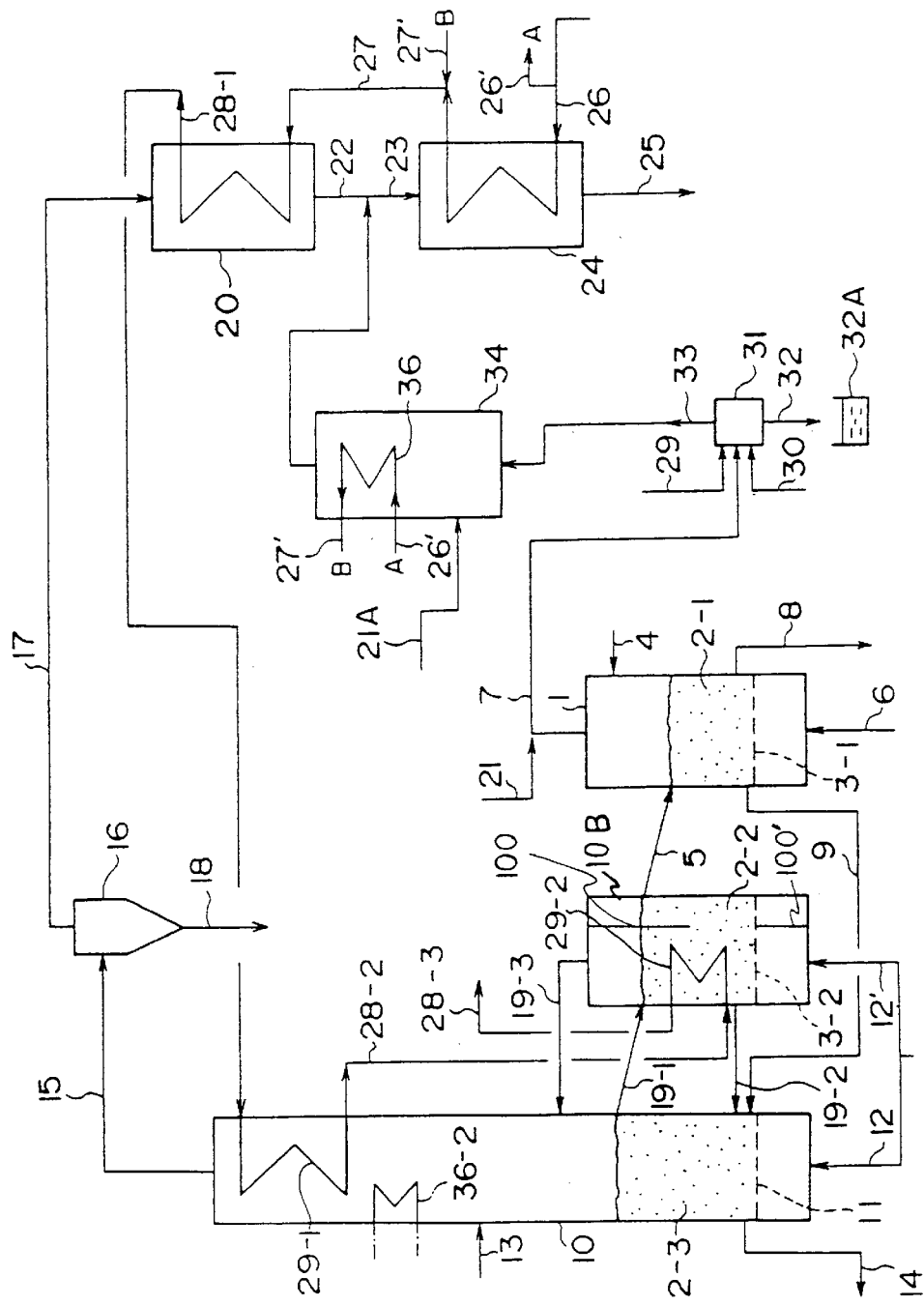

FIG. 12 illustrates an apparatus for producing superheated steam using the heat of combustion of waste materials, which system is a sixth preferred embodiment of this invention. The char combustion furnace shown in FIG. 2 is divided into two fluidized beds by a partition panel to prevent backflow. An ash-melting furnace is also provided.

Figure 13:
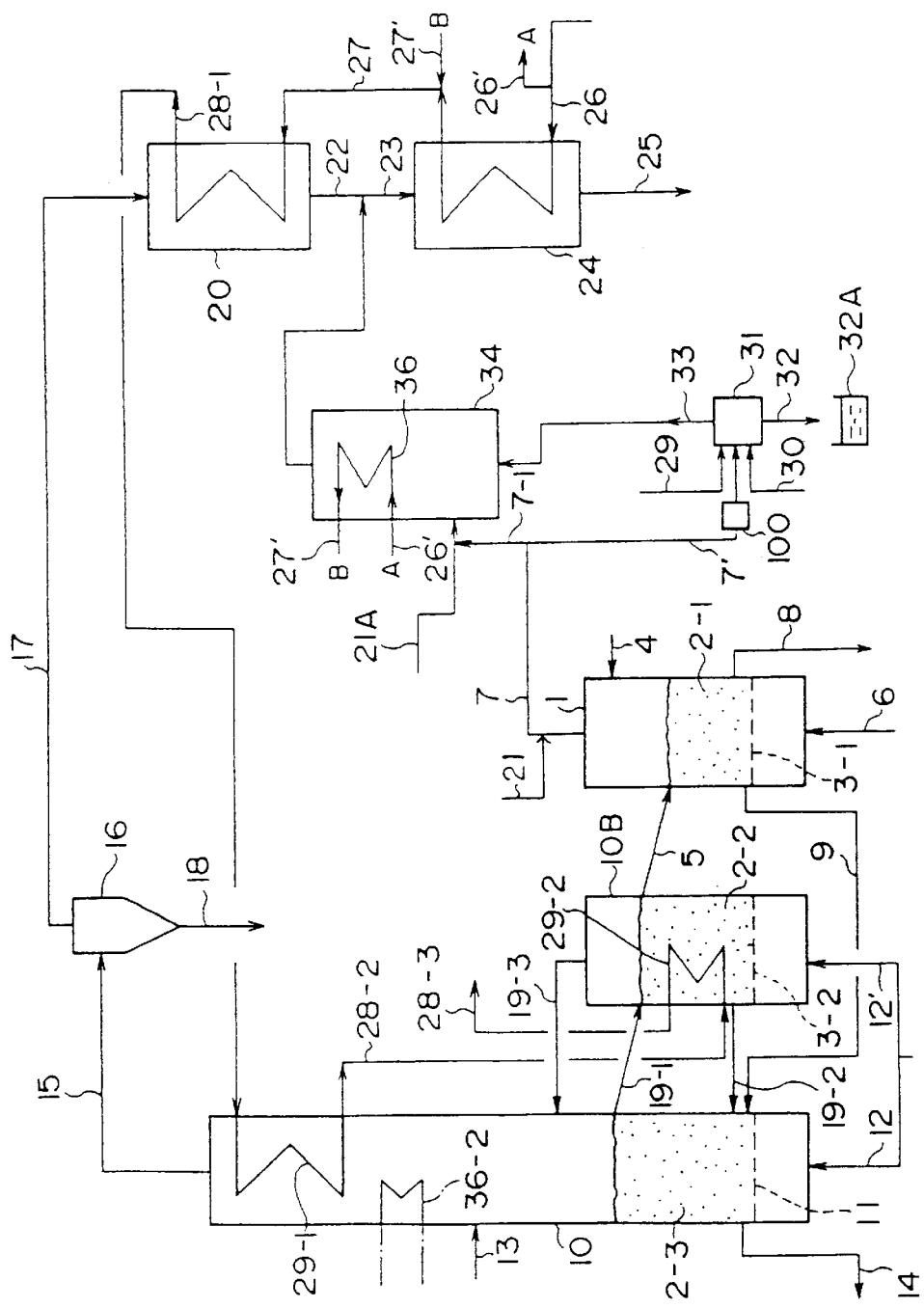

FIG. 13 illustrates an apparatus for producing superheated steam using the heat of combustion of waste materials, which system is a seventh preferred embodiment of this invention. In addition to the configuration shown in FIG. 12, the system diverts a portion of the pyrolysis gases and supplies them to a pyrolysis gas furnace where they are combusted.

Figure 14A:
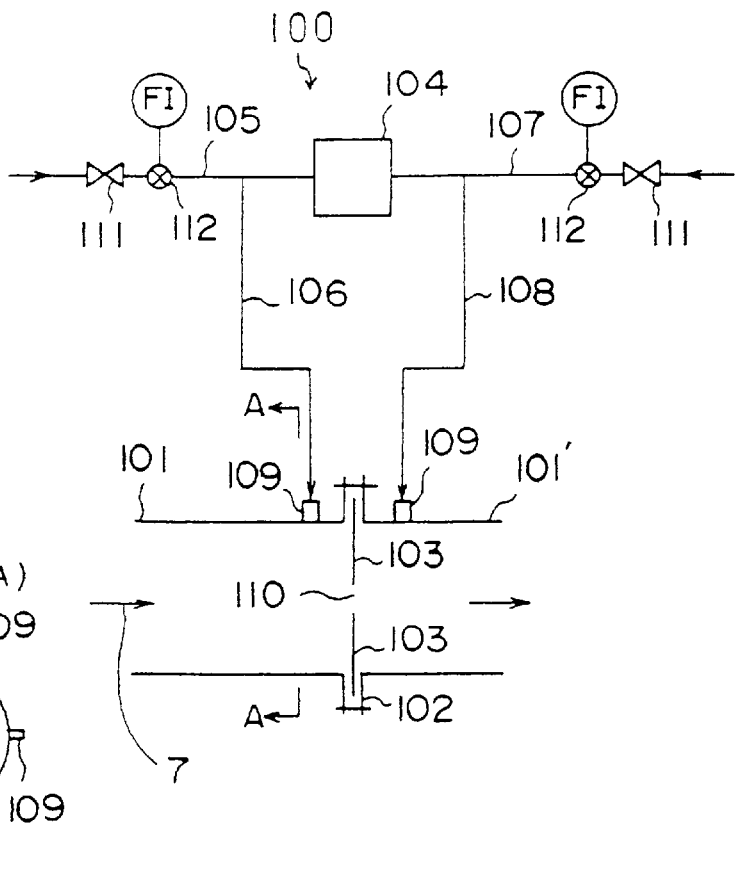
Figure 14B:
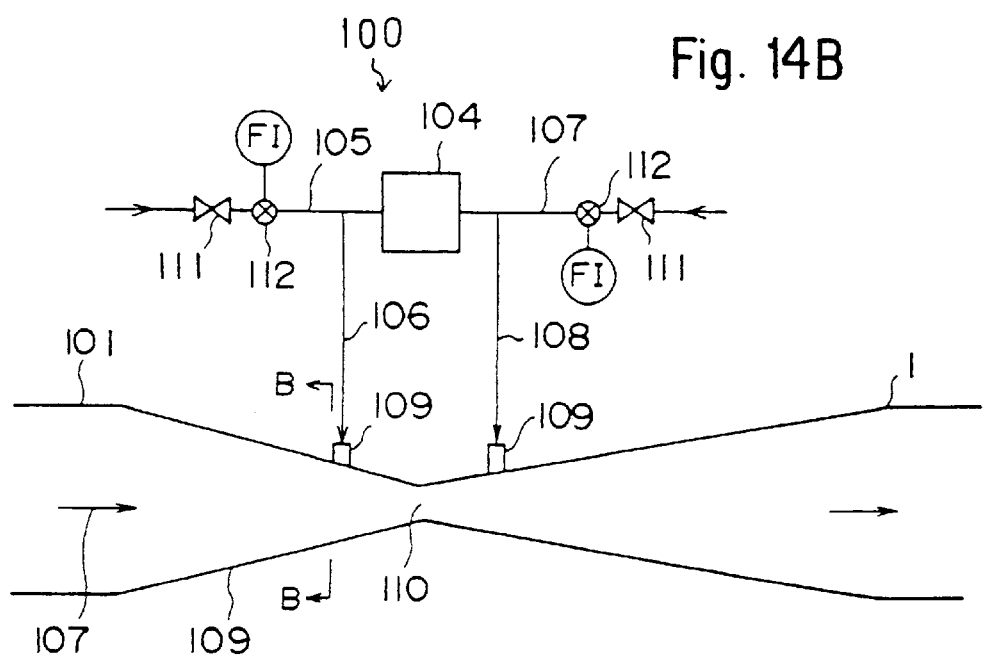

FIG. 14 shows a differential pressure gauge which is installed in the discharge line for pyrolysis gases shown in FIG. 13. (A) is a differential pressure gauge which makes use of an orifice; (B) is a differential pressure gauge which makes use of a horn neck.

Figure 15:
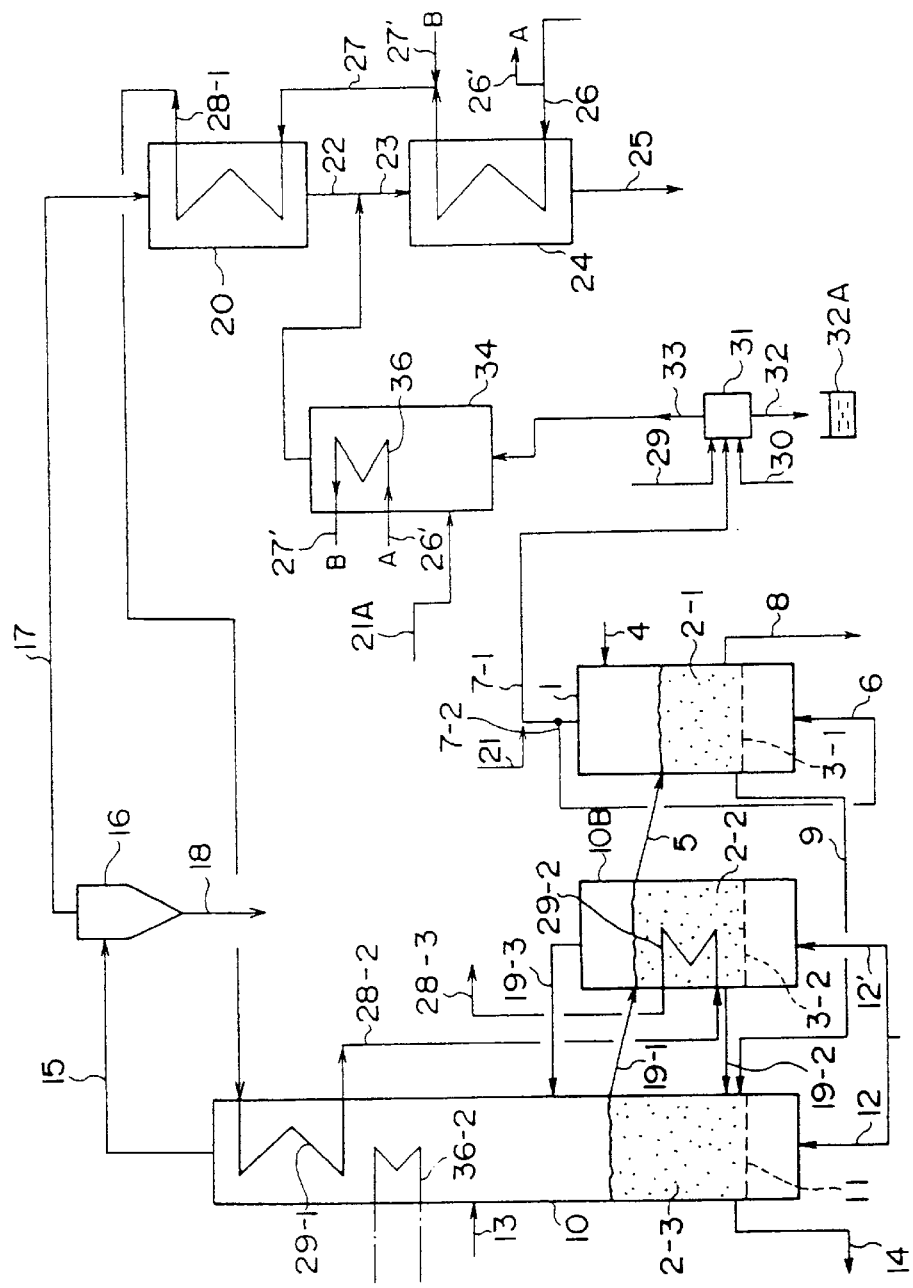

FIG. 15 illustrates an apparatus for producing superheated steam using the heat of combustion of waste materials, which system is an eighth preferred embodiment of this invention. A portion of the pyrolysis gases obtained from the pyrolysis furnace are circulated to the bottom of the pyrolysis furnace by way of a branch line.

Figure 16:
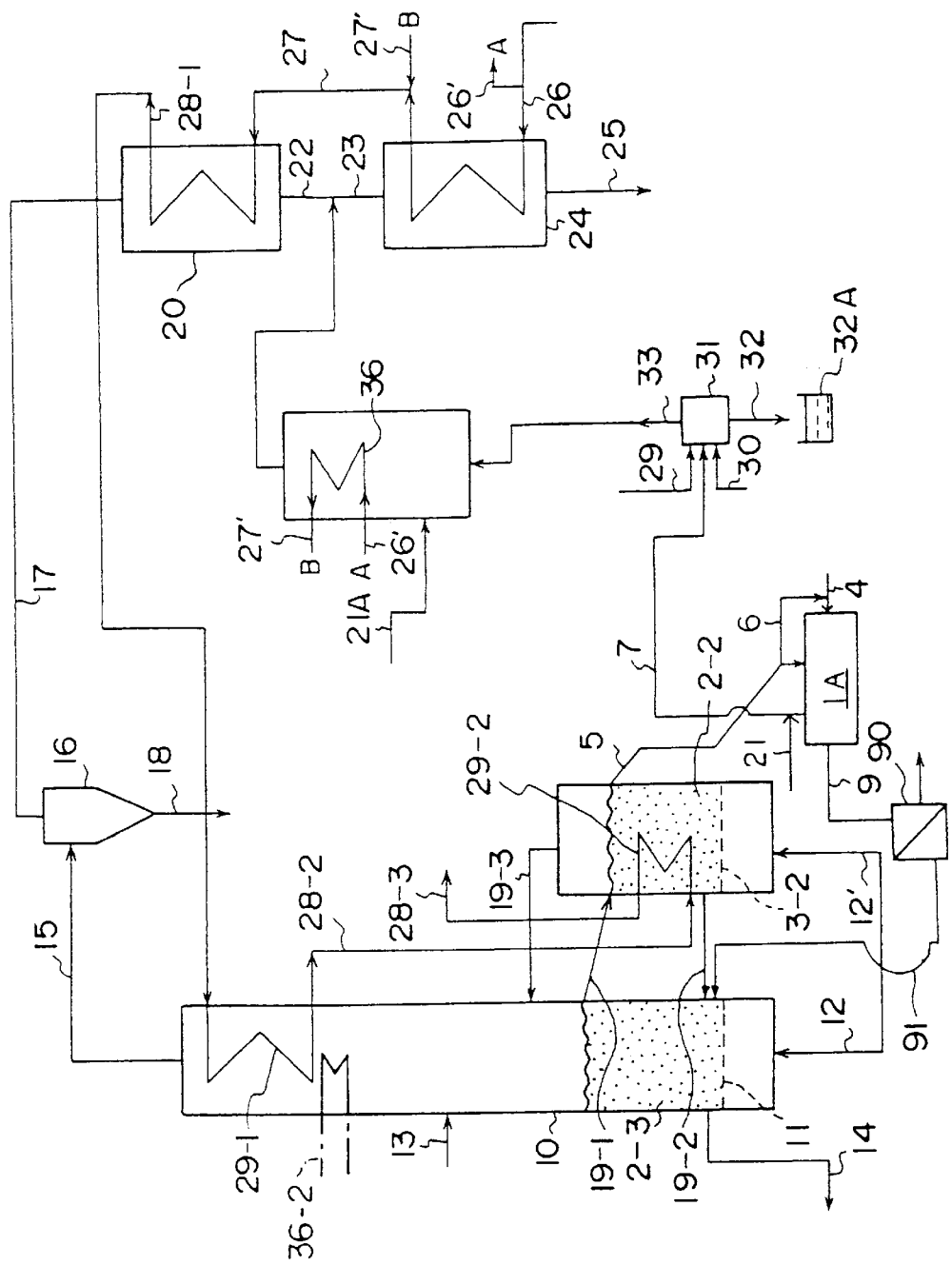

FIG. 16 illustrates an apparatus for producing superheated steam using the heat of combustion of waste materials, which system is a ninth preferred embodiment of this invention. The pyrolysis furnace is not a fluidized bed, but instead employs a mechanical conveyor.

Figure 17:
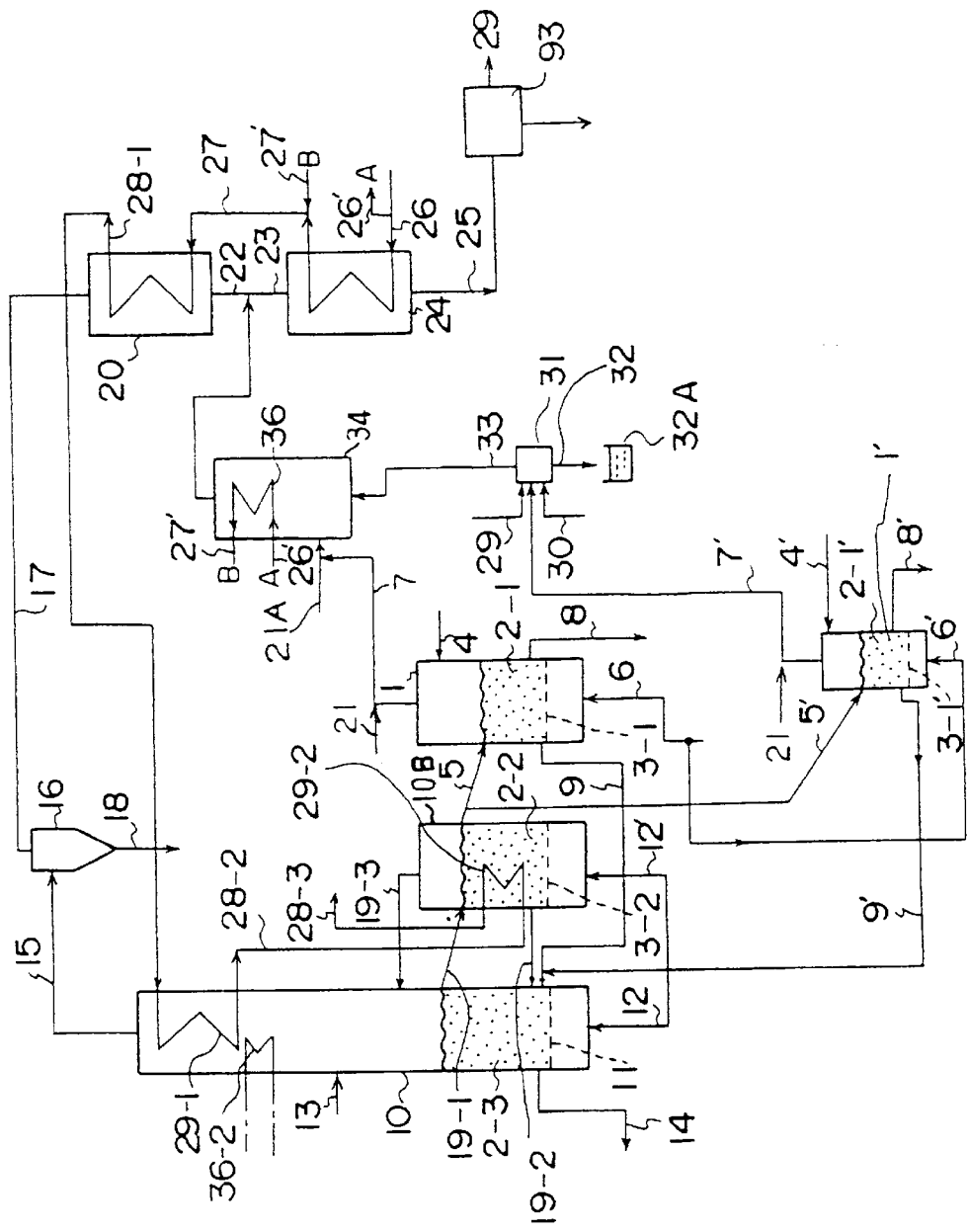

FIG. 17 illustrates an apparatus for producing superheated steam using the heat of combustion of waste materials, which system is a tenth preferred embodiment of this invention. This system uses more than one pyrolysis furnace.

Figure 18:
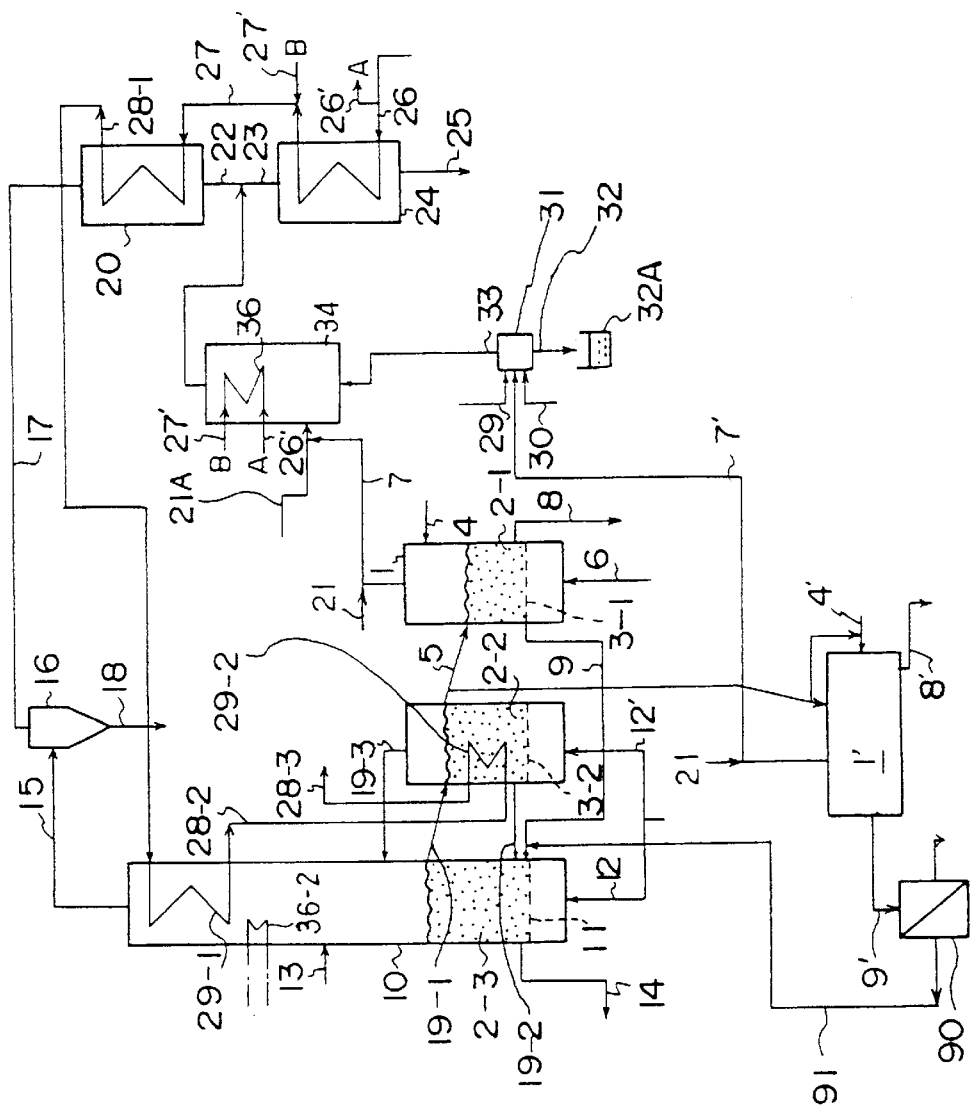

FIG. 18 illustrates an apparatus for producing superheated steam using the heat of combustion of waste materials, which system is an eleventh preferred embodiment of this invention. The pyrolysis furnace employs a fluidized bed and mechanical conveyor agitation means.

PREFERRED EMBODIMENTS OF THE INVENTION

In this section we shall explain in detail, with reference to the drawings, several preferred embodiments of this invention. Insofar as the dimensions, material, shape and relative position of the structural components which figure in the embodiments are not specifically disclosed, the scope of the invention is not limited to those shown. The embodiments are meant to serve merely as illustrative examples.

Figure 1:
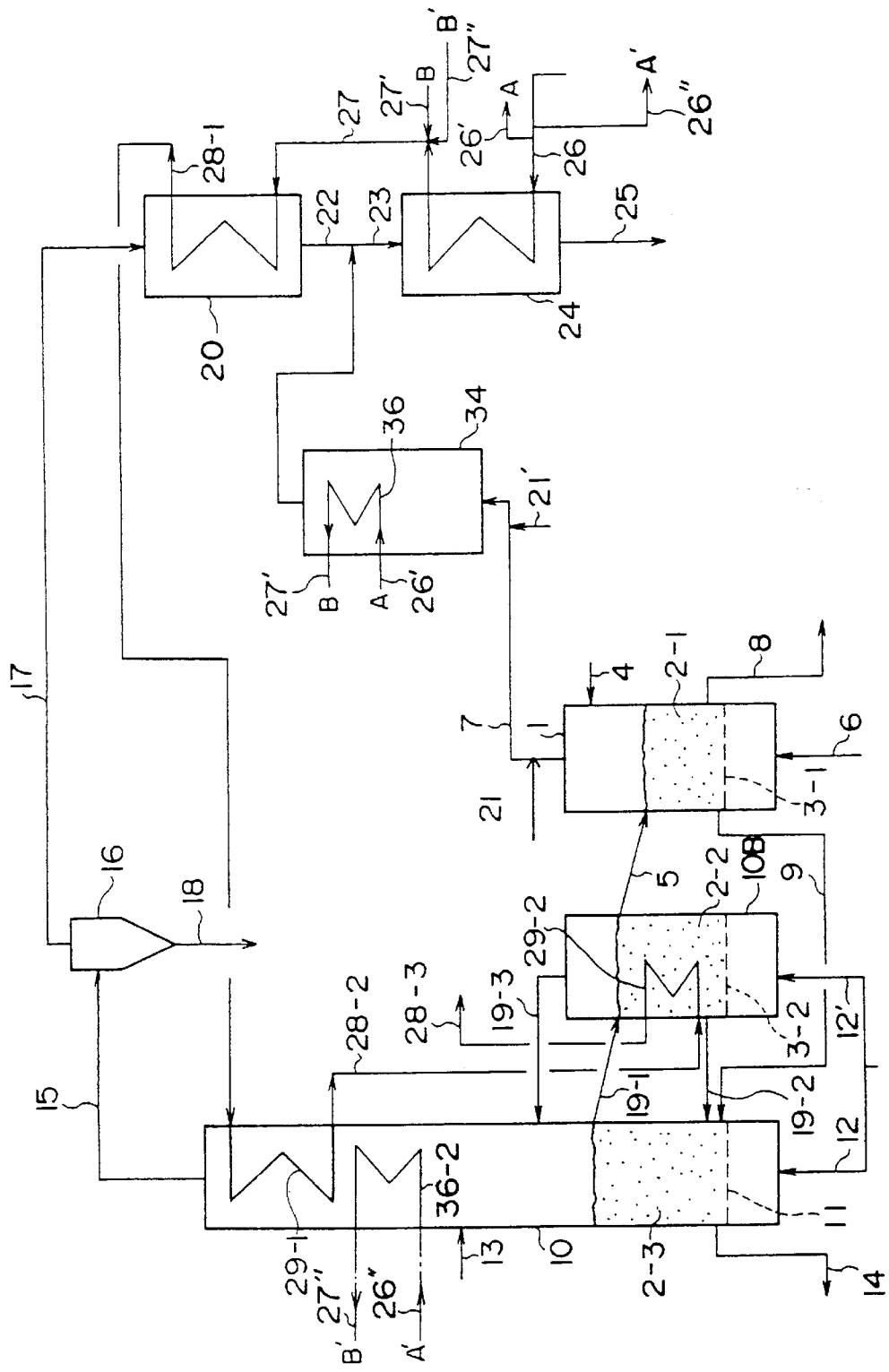
FIG. 1 illustrates an apparatus for producing superheated steam using the heat of combustion of waste materials, which system is a first preferred embodiment of this invention. Between the char combustion furnace and the pyrolysis furnace is an auxiliary char combustion furnace.

FIG. 1 shows an apparatus for producing superheated steam using the heat from incineration of waste materials which is a first preferred embodiment of the present invention. In this figure, 1 is a pyrolysis furnace comprising a fluidized bed; the fluidized bed medium 2-1, namely, fluidized sand or a similar material, is supplied onto dispersion plate 3-1, which is a perforated plate or the like. The garbage or other waste material enters the system via supply line 4, and the fluidized sand via circulation (or return) line 5. The combustion exhaust gas supplied via input line 6 creates a chamber in the fluidized bed which is at least 300° C. (Since this pyrolysis furnace is basically designed to pyrolyze rather than combust the material, most of the gas supplied will be combustion gas from which the oxygen has been consumed. However, to help control the temperature, small quantities of air are introduced as needed.) A pyrolytic reaction of the waste material is induced. The pyrolysis gases generated by this reaction are removed via discharge line 7. The unpyrolyzed residue and the char mixture composed largely of sand are removed via line 9. Uncombusted matter is removed via line 8.

It is desirable that pyrolysis be carried out so as to generate a calorie ratio of approximately 7:3 (pyrolysis gases to char mixture).

If the boiler water which is to be heated is pressurized at approximately 100 Kgf/cm$^2$, its boiling point will be approximately 309° C. The "7" in the ratio of 7:3 refers to the calories needed to raise the temperature of the water in boilers 36, 36-2 and 24 from its normal temperature to a "temperature equal to 309° C.+the latent heat of vaporization", in other words the calories needed to raise the temperature to 309° C., the point where most of the water vaporizes; the "3" refers to the calories needed to heat the steam from its boiling point of 309° C. to 500° C.

Air input line 21 is attached to line 7, the discharge line for pyrolysis gases from furnace 1. Air is introduced through line 21 into the pyrolysis gases removed from furnace 1, and any tars contained in these gases are partially combusted. These measures should be taken as needed to prevent the adherence of tars or coking in discharge line 7.

At the downstream end of the discharge line 7 is a pyrolysis gas combustion furnace 34, a combustion chamber for the pyrolysis gases. A sufficient amount of air is supplied to the pyrolysis gases via line 21' so that they are completely combusted.

10 is a char combustion furnace comprising a fluidized bed suspended in an air stream. The char mixture is supplied via discharge line 9 to dispersion plate 11 on the floor of the furnace. The fluidized sand is circulated between this furnace and auxiliary combustion furnace 10B by way of lines 19-2 and 19-1.

Air is supplied via line 12, which is below the dispersion plate 11. Heated to between 650° C. and 800° C. in fluidized bed 2-3, this air is used to combust the unpyrolyzed residue. Air is also introduced through line 13 into the middle of char combustion furnace 10 to complete the combustion. This generates exhaust gases in the range of 800° C. to 1,300° C. A second superheater 29-1 is placed in the upper portion of char combustion furnace 10. This superheater boosts the temperature of the superheated steam introduced via line 28-1 from the second type of steam generator to produce steam (the first superheater, 20). The exhaust gases, which have been raised to a temperature somewhere in the range of 950° C. to 1,300° C., are allowed to cool to 800° C. to 950° C.

Even though the temperature of the combustion gases drops to 800° C. to 950° C. as stated above, there is no problem maintaining the temperature of the steam in superheater 20 at 200° C. to 320° C.

Small particles of matter which were not combusted in the furnace 10 are removed via discharge line 14.

Auxiliary char combustion furnace 10B is attached to char combustion furnace 10 as an auxiliary fluidized bed. As can be seen in FIGS. 1 and 2, the fluidized sand flows between 10 and 10B via circulation lines 19-2 and 19-1. The third superheater, 29-2, is placed in fluidized bed medium 2-2 in the auxiliary char combustion furnace 10B. It is connected to the discharge side of the second superheater, 29-1, via line 28-2.

As can be seen in FIG. 2, auxiliary char combustion furnace 10B may also be set up independently; however, as is shown in FIG. 1, it is advisable to place auxiliary char combustion furnace 10B, with its third superheater, 29-2, somewhere along the path 19-1 and 5 by which the fluidized bed medium which was heated in the char combustion furnace 10 is returned to pyrolysis furnace 1.

The combustion gases which have exchanged heat with the second superheater, 29-1, are led as needed via discharge line 15 into a gas/solid separator such as cyclone 16. Here the dust, ash and exhaust gases are separated, and the gases are sent to the first superheater, 20, via discharge line 17. 20 is the first superheater, and 24 is the first boiler. The pyrolysis gases removed via discharge line 7 are completely combusted in pyrolysis gas combustion furnace 34, within which is installed water-cooled boiler 36. Along with the combustion gases exhausted from superheater 20 via line 22, they are introduced into boiler 24. The boiler water taken in via entry port 26 is heated to 200° C. to 320° C., and the resulting steam or hot water is supplied to superheater 20 via discharge line 27.

Boiler water is also introduced via branching line 26' into water-cooled boiler 36, which is in pyrolysis gas combustion furnace 34. Steam or hot water is supplied via branching line 27' to superheater 20.

The boiler water, pressurized to approximately 100 Kgf/cm$^2$ to raise its boiling point to approximately 309° C., is introduced into water-cooled boilers 36 and 36-2 and into boiler 24, and the first stage of heating is accomplished. The rate of water flow is controlled so that the temperature attained is approximately 309° C., which is close to the boiling point.

As a result, the temperature of the tube surfaces in water-cooled boiler 36 and boiler 24, conforming to the temperature of the hot water, can be kept below 350° C.

Even if there are chlorides or HCl in the pyrolysis gases whose heat is exchanged, corrosion does not occur.

The steam and/or hot water removed from boiler 24 via discharge line 27 and the steam/hot water heated in water-cooled boiler 36 and removed via branching line 27' are introduced into superheater 20. They are heated by the combustion gases supplied via the line 17 to produce superheated steam and then introduced sequentially into superheater 29-1 via discharge line 28-1 and superheater 29-2 via line 28-2 connected in sequence. When it has attained a temperature between 400° C. and 520° C., the steam is removed and supplied to an electric generator.

Although we have already discussed the operation of the embodiment along with its configuration, we shall briefly reiterate it here. Organic compounds containing chlorides such as vinyl chloride plastics are mixed in with other waste materials in garbage supplied to pyrolysis furnace 1. The combustible portion contains approximately 0.2–0.5% Cl. Garbage is supplied to pyrolysis furnace 1 via line 4, and heated fluidized sand is supplied via line 5. Small quantities of air are supplied to the combustion exhaust gases via entry line 6 on the bottom of the furnace as needed for temperature control. In fluidized bed 2-1, created by fluidizing a quantity of sand, the temperature is kept between 350° C. and 500° C. This results in a unpyrolyzed residue, essentially free of chlorine compounds, being obtained through discharge line 9.

Essentially all the chlorine compounds which were contained in the waste material are now contained in the pyrolysis gases, which are discharged via line 7. Large particles of uncombusted material which are separated in the pyrolytic reaction in pyrolysis furnace 1 are removed from the furnace via discharge line 8.

The duration and temperature of pyrolysis are chosen so that the calorie ratio of the pyrolysis gases and the char mixture will be 7:3.

The pyrolysis gases removed via discharge line 7 on furnace 1 contain gases, oil fractions, tars and HCl; however, the introduction of a small quantity of air supplied by line 21 on the upstream end of discharge line 7 causes these to be partially combusted without a drop in the temperature. This prevents the adherence of tars and coking in line 7. A quantity of air is then introduced via line 21' into pyrolysis gases combustion furnace 34, where the pyrolysis gases are completely combusted.

Because the temperature of the pyrolysis gases can be kept high in pyrolysis gases combustion furnace 34, a large quantity of steam/boiler water can be introduced into water-cooled boilers 36 and 36-2 and boiler 24 and heated to nearly the boiling point, 200° C. to 320° C.

Once they have exchanged heat with water-cooled boiler 36 in pyrolysis gases combustion furnace 34, the exhaust gases from the combustion of the pyrolysis gases are supplied via entry line 23 to boiler 24 along with the superheater combustion exhaust gases from discharge line 22.

The concentration of HCl in the gases introduced into the pyrolysis gases combustion furnace 34 and boiler 24 is approximately 500 to 1,000 ppm. By controlling the flow rate of the boiler water, the surface temperature of the tubes in water-cooled boiler 36 and boiler 24 can be kept below 350° C., their normal temperature in prior art apparatuses, and high-temperature corrosion can thereby be prevented. Thus water-cooled boilers 36 and 36-2 and boiler 24 cannot produce superheated steam, but heat the water only to 300° C. to 320° C. Once this partially heated water passes through superheater 20 and is further heated by superheaters 29-1 and 29-2, superheated steam is produced which has a temperature of 500° C. to 700° C.

The char mixture removed from pyrolysis furnace 1 via discharge line 9 consists of fluidized sand and unpyrolyzed residue. This mixture, which is essentially free of chlorine compounds, is supplied to the lower portion of char combustion furnace 10. Air which is supplied via line 12 through dispersion plate 11 causes the mixture to combust. The quantity of air supplied via line 12 is controlled, and the unpyrolyzed residue is combusted while the sand is fluidized. To insure that the residue is completely combusted, air is also supplied via lines 13 and 19-3. The temperature of char combustion furnace 10 will rise due to the heat of combustion. The value of this temperature is determined by the caloric value of the unpyrolyzed residue supplied via line 9, the volume of air supplied by lines 12 and 13, and the temperature of the fluidized sand from lines 19-1 and 19-2; however, it may go as high as 1,000° C. to 1,200° C.

Heat from the superheated steam in superheater 20 is exchanged via line 28-1 with superheater 29-1. This makes it easier to raise the temperature of the combustion gases to 800° C. to 950° C. Instead of or in addition to superheater 20, a water-cooled boiler 36-2 may be provided as needed to heat the boiler water circulated via lines 26" and 27", which branch off from lines 26 and 27.

Small particles of uncombusted material resulting from the melting of glass or cans are removed via discharge line 14.

Auxiliary char combustion furnace 10B may be set up independently according to the second preferred embodiment of this invention, as shown in FIG. 2; however, the fluidized bed medium in the char combustion furnace 10 circulates back to pyrolysis furnace 1. Since the temperature of the medium in furnace 10 is approximately 700° C. to 850° C. and that of the medium in furnace 1 is 350° C. to 500° C., there is a significant temperature differential between the two furnaces. When the medium from char combustion furnace 10 is introduced directly into pyrolysis furnace 1, it is possible that the heat differential will cause the temperature of pyrolysis to spike locally within pyrolysis furnace 1 or fluctuate. This makes it extremely complicated to regulate the quantity of fluidized bed medium returned to furnace 1.

For this reason, as shown in FIG. 1, an auxiliary char combustion furnace 10B with a third superheater, 29-2, is provided on the path defined by lines 19-1 and 5, the path by which the fluidized bed medium is returned from the char combustion furnace 10 to pyrolysis furnace 1. Superheater 29-2 in the auxiliary char combustion furnace 10B strips heat from the fluidized bed medium, which was heated to 700° C. to 800° C. in furnace 10, to reduce its temperature to 500° C. to 700° C. Returning the medium to furnace 1 at 500° C. to 700° C. makes possible a gentle rate of change of heat, so that the pyrolysis temperature inside the furnace 1 can be kept in a stable fashion between 350° C. and 500° C. 28-3 is the line to remove superheated steam; 12' is an air supply line.

The combustion gases generated in char combustion furnace 10 at a temperature of 800° C. to 950° C., which are virtually free of chlorine compounds, are introduced as needed into cyclone 16 via discharge line 15. In the cyclone, dust and ash are separated from the exhaust gases. The former are removed via discharge line 18 and the latter via discharge line 17.

The exhaust gases removed via discharge line 17 on the cyclone 16, which are at a temperature of 800° C. to 950° C., are introduced into superheater 20. The 200° C. to 320° C. steam/boiler water produced in boiler 24 and water-cooled boiler 36 are heated further to produce superheated steam. The exhaust gases which come through discharge line 17 are virtually free of chlorine compounds, so even if the surface temperature of the boiler tubes in superheater 20 exceeds 350° C., the extent of high-temperature corrosion is significantly reduced. The fluid in the tubes can have a temperature of 400° C. to 520° C., and superheated steam can be obtained in a stable fashion from discharge port 28-1.

To maintain the temperature in the pyrolysis furnace 1 at a prescribed value of at least 300° C., the quantity of oxygen in the fluidizing gas supplied via entry line 6 is regulated. That is to say, a small quantity of air is supplied along with the combustion exhaust gases from boiler 24, and a portion of the fluidized sand from auxiliary char combustion furnace 10B, which has a temperature of 500° C. to 700° C., is supplied as a heat source via circulation line 5 to maintain the temperature.

To induce pyrolysis efficiently in the range of 350° C. to 500° C., the air and combustion exhaust gases supplied to pyrolysis furnace 1 via entry line 6 should consist of air and low-oxygen (approximately 3 to 5%) combustion exhaust gases maintained at a temperature of 150° C. to 200° C. More specifically, the combustion exhaust gases removed from discharge line 25 of boiler 24 can be used once the dust and chlorine component have been extracted from them.

In FIGS. 1 and 2, 11, 3-1 and 3-2 are dispersion plates, and 2-1, 2-2 and 2-3 are fluidized beds.

FIG. 4 is a system diagram of a third preferred embodiment of this invention, another apparatus to produce superheated steam using the heat from incinerating waste material. We shall explain only those aspects which differ from the example shown in FIG. 1. Filter 291, a vibrating screen with a mesh diameter of 5 mm, is provided on discharge line 8 of the pyrolysis furnace 1. The material exhausted via the line 8 is separated into large particles of uncombusted material and other exhaust matter. The other exhaust matter is supplied via lines 50 and 54 to the bottom of the fluidized bed above dispersion plate 11 in char combustion furnace 10. 51 is the line which removes the large particles of uncombusted material.

Smaller particles of material which were not combusted in furnace 10 are removed via line 14. The discharge line 14 has a filter 292 with openings approximately 2 mm in diameter. The material removed via the line 14 is separated into small particles of uncombusted material on the one hand, and fluidized sand and ash on the other. The fluidized sand is supplied via line 52, filter 293, and lines 55 and 54 to the bottom of the fluidized bed above dispersion plate 11 in char combustion furnace 10. The larger particles of uncombusted material are discharged to the exterior via line 53.

Filter 293 is not absolutely necessary; however, it will catch any sand that manages to pass through filter 292 while discharging ash to the exterior. The diameter chosen for its mesh openings is approximately 0.1 mm so that they will be smaller than the minimum diameter of the grains of sand (approximately 0.2 mm).

Thus filter 293 can catch any grains of sand passed through filter 292 and pass the ash, and only the ash through to the exterior via line 56. The use of this filter makes it more efficient and easier to remove the ash and recover the sand.

We shall next discuss in detail the operation of the embodiment.

Larger particles of uncombusted material separated in the pyrolytic reaction which takes place in pyrolysis furnace 1 are removed from the furnace via discharge line 8.

Generally, the waste material fed into pyrolysis furnace 1 is crushed to pieces approximately 200 mm in diameter. Thus discharge line 8, through which uncombusted matter is removed from furnace 1, must have a relatively large diameter. As a result, in addition to larger particles of uncombusted matter, char residue, sand and smaller particles of uncombusted matter are also removed via the line 8.

Filter 291 separates the material exhausted through discharge line 8 of pyrolysis furnace 1 into larger particles of uncombusted matter and other exhaust. Only the larger particles of uncombusted matter are discharged; the other substances are supplied to the bottom of char combustion furnace 10 and applied to combustion.

Glass shards, iron scraps and other smaller pieces of uncombusted material are removed from char combustion furnace 10 via discharge line 14. The larger pieces of uncombusted material have already been removed from the char combustion furnace 10, and the char residue has been adequately combusted. Thus the only material discharged through line 14 will be smaller pieces of uncombusted material and sand. These can be separated by filters 292 and 293. The filtered sand may be recirculated by supplying it to the bottom of the fluidized bed in furnace 10.

FIG. 5 is a system diagram of a fourth preferred embodiment of this invention, another apparatus to produce superheated steam using the heat from incinerating waste material. The auxiliary char combustion furnace 10B in FIG. 4 has been partitioned by two partition panels in order to prevent backflow of the gases.

The auxiliary char combustion furnace 10B has two partition panels, 100 and 100', which partition the side of the furnace from which line 5 returns the fluidized sand to pyrolysis furnace 1. These partition panels partition the upper portion of the fluidized bed and the portion below dispersion plate 3-2. The lower part of the partition panel above dispersion plate 3-2 has an opening 101, through which the fluidized bed medium from the fluidized bed in which superheater 29-2 is installed (hereafter called "primary fluidized bed 2-2A") is supplied to the secondary fluidized bed 2-2B which has been created by partition panel 100.

The sand in secondary fluidized bed 2-2B is fluidized by combustion exhaust gases supplied via branching line 6' beneath dispersion plate 3-2.

Partition panel 100 prevents the gases in the upper portion of pyrolysis furnace 1 from mixing with those in the upper portion of auxiliary char combustion furnace 10B while allowing the sand to move freely between the two furnaces.

Let us call the pressure in primary fluidized bed 2-2A of the auxiliary char combustion furnace 10B $P_1$, that in its secondary fluidized bed 2-2B $P_1'$, and that in pyrolysis furnace 1 $P_2$. Since the secondary fluidized bed and the pyrolysis furnace are connected via return (sand circulation) line 5, $P_1'$ and $P_2$ will have the same value.

Partition panel 100 is placed in the fluidized bed so that its unattached end is in the portion of the bed where the fluidizing is most dense. Let us call the height from the surface of the fluidized bed to the lower end of partition panel 100 (which is also the top of opening 101) $\Delta H$, the pressure in the pyrolysis furnace 1 $P_2$, and that in the primary fluidized bed of auxiliary char combustion furnace 10B $P_1$. The backflow of the gases occurs only if it is not true that $$\Delta H \cdot \rho + P_2(P_1') > P_1$$

where $\rho$ is the density of the fluidized bed (i.e., its specific gravity). Thus it is not possible for gases to flow from bed 2-2B back to primary bed 2-2A.

It is further advisable that return (sand circulation) line 5 be canted slightly downward from furnace 10B to furnace 1.

In this embodiment, after a portion of the fluidizing's heat is absorbed by superheater 29-2 in primary bed 2-2A of the auxiliary char combustion furnace 10B, the fluidized bed medium is conducted around the partition panel 100 into secondary fluidized bed 2-2B. The sand is fluidized by the combustion exhaust gases which arrive via branching line 6' and returned to pyrolysis furnace 1 via circulation line 5.

Even if pressure $P_1$ in primary bed 2-2A or pressure $P_2$ ($P_1'$) in pyrolysis furnace 1 fluctuates, the pressure differential which can occur between $P_1$ and $P_1'$ due to partition panel 100 will be ΔH, so gases cannot flow back from the furnace 1 to bed 2-2A of auxiliary char combustion furnace 10B, and the sand will be returned in a normal fashion.

In FIG. 6, a sand storage tank 120 is provided on the char combustion furnace 10 in the system shown in FIG. 5. Sand is supplied as needed via line 121.

With this configuration, when it is necessary to change the pyrolysis time for different types of garbage, the quantity of sand in the furnace can be increased by supplying more sand from sand storage tank 120 and thereby increasing the pyrolysis time. The pyrolysis time can be shortened by removing a large quantity of sand via line 14 to reduce the quantity of sand in the furnace.

FIG. 7 shows an example of a backflow prevention means which is placed on line 9, the line by which the char mixture is removed. Mechanical conveyor 50B prevents backflow if the pressure in the pyrolysis furnace 1 is kept higher than the pressure in char combustion furnace 10.

The sand inside mechanical conveyor 50B is packed tightly together, which enhances the effect of a gas seal created by the fluidized sand. 55 is the partition panel which partitions the bed.

FIG. 8 provides a more detailed view of the auxiliary char combustion furnace 10B which can be seen in FIGS. 5 and 6 discussed above. As can be seen in FIG. 8 (A), fluidized bed medium is fed into furnace 10B from char combustion furnace 10 via line 19-1 and returned to pyrolysis furnace 1 via circulation line 5, which is connected to furnace 10B diagonally across from line 19-1. The fluidized bed medium is moved from the base of superheater 29-2 toward its upper end so as to be in sufficient contact with the heat. As can be seen in FIG. 8 (B), a pressuring unit 50 to create a pressure differential is placed at the base of the return line (circulation line) 5. This unit creates a differential larger than the differential ($P_1-P_2$) between the pressure $P_1$ in the side of pyrolysis furnace 1 and the pressure $P_2$ in auxiliary char combustion furnace 10B.

Pressuring unit 50 is placed in the secondary fluidized bed. The upper portion of bed 2-2 and the area below dispersion plate 3-2 are partitioned on the discharge side of furnace 10B by partition panels 100 and 100'. In the lower portion of the fluidized bed above dispersion plate 3-2 is opening 101. The fluidized bed medium in auxiliary char combustion furnace 10B is supplied to secondary fluidized bed 51, which is created by partition panel 100 on the side of the chamber where pressuring unit 50 provides a pressure differential, through opening 101 under the partition panel.

The sand in secondary fluidized bed 51 is fluidized by combustion exhaust gases supplied from below dispersion plate 3-2 via line 6', which branches off line 6.

Pressuring unit 50 provides the same function of preventing the backflow of gas as occurred in FIGS. 5 and 6. If $P_1$ is the pressure in the primary fluidized bed 2-2 of the auxiliary char combustion furnace 10B, $P1'$ is the pressure in the secondary fluidized bed 51, and $P_2$ is the pressure in pyrolysis furnace 1, then $P1'$ must be identical to $P_2$ because of the connection of the two chambers via return (circulation) line 5.

Partition panel 100 is placed in fluidized bed 2-2 so that its unattached end is in the portion of the bed where the fluidized medium is most dense. A height H from the surface of the fluidized bed to the lower end of partition panel 100 (which is also the top of opening 101) should be chosen which will not allow backflow to occur.

Line 19-1, which brings the fluidized bed medium from char combustion furnace 10 into auxiliary char combustion furnace 10B, and line 5, which returns the medium from furnace 10B to pyrolysis furnace 1, both have their downward-sloped discharge ends lower than their intake ends, so that the surface of each successive fluidized bed is lower than the previous one. In other words, the surfaces of the fluidized beds get lower in step fashion, so that the height of the surface of fluidized bed 2-3 in char combustion furnace 10 is greater than or equal to the height of the surface of primary fluidized bed 2-2 in auxiliary char combustion furnace 10B, which equals the height of the surface of secondary fluidized bed 51 on the same side of the partition panel as pressuring unit 50; and the height of the surface of bed 2-2 is greater than the height of the surface of fluidized bed 2-1 in pyrolysis furnace 1.

Line 9, which supplies the char mixture from pyrolysis furnace 1 to char combustion furnace 10, should be a mechanical conveyor such as a screw feeder.

FIG. 9 shows an improved configuration for the fluidized bed which is used in the char combustion furnace in each of the embodiments previously discussed. (A) is a front view; (B) is a side view; (C) is a plan view.

The char mixture is loaded onto dispersion plate 11 to create fluidized bed 2-3. The interior of bed 2-3 is divided from left to right into three regions, 2-3A, 2-3B and 2-3C, by partition panels 61A and 62A, which are placed in the upper portion of the chamber in such a way that the sand can circulate in all three regions. Openings are provided both above and below the partition panels.

Lines 9 and 19-2, which supply the char mixture and the fluidized bed medium from pyrolysis furnace 1 and auxiliary char furnace 10B to char combustion furnace 10, are connected to region 2-3B, the middle region of the three created by partition panels 61A and 62A.

Dispersion plate 11 is slanted toward line 14, the discharge line for uncombusted matter.

The chamber below dispersion plate 11 is divided into three regions by partition panels 61B and 62B, which are placed at the same intervals as their counterparts in the upper chamber, 61A and 62A. The central portion 11-2 of the dispersion plate, partitioned by the partition panels 61B and 62B, is more effective if it is shaped like a cone.

Line 12 branches into lines 12-1, 12-2 and 12-3, which supply air into the bottoms of the chambers below dispersion plates 11-1, 11-2 and 11-3, respectively. These chambers are created by partition panels 61B and 62B. A valve 64 is provided on each of lines 12-1, 12-2 and 12-3 to control the air flow. These valves allow the air which flows into the three regions created by upper partition panels 61A and 62A to be controlled.

Line 19-1, which supplies the fluidized bed medium to auxiliary char combustion furnace 10B, is at the surface of fluidized bed 2-3. Line 19-3, which supplies the combustion gases from furnace 10B, is above line 19-1.

In this device, the inlet of line 9, which supplies the char mixture from pyrolysis furnace 1, is in the lower portion of the center region 2-3B of the three regions (the region of downward flow), or there may be two inlets for line 9, one in the lower portion of each of the lateral regions 2-3A and 2-3C (the regions of upward flow). Dispersion plate 11-2, which is below the inlet in center region 2-3B, is shaped like a cone so that the air will flow more to lateral regions 2-3A and 2-3C than to the central region 2-3B. Line 12-2 is adjusted so that it delivers less air than lines 12-1 and 12-3; an upward air flow is supplied into regions 2-3A and 2-3C via lines 12-1 and 12-3, which are below dispersion plates 11-1 and 11-3. Because of these arrangements, the air in central region 2-3B is made to flow downward, while the air in lateral regions 2-3A and 2-3C is made to flow upward.

Let us consider, for example, a char mixture which is supplied via line 9 to the lower portion of central region 2-3B (the region of downward flow) or to the lower portions of lateral regions 2-3A and 2-3C (the regions of upward flow). Conical dispersion plate 11-2 causes the air to flow from the central region 2-3B to lateral regions 2-3A and 2-3C, so that the fluidized bed medium flows downward in central region 2-3B. At the same time, an updraft is created in lateral regions 2-3A and 2-3C. The char mixture and the fluidized bed medium circulate in the fluidized bed as indicated by the arrows in (A).

Thus the char, which has a low specific gravity, will always move from region 2-3B with its downward flow to the bottom of the fluidized bed. It will attain a sufficient air mix as it circulates through lateral regions 2-3A and 2-3C. This arrangement enables adequate combustion using a small air flow (on the order of an air ratio of 8:1.2 to 1.3).

Char which floats on the surface of the fluidized bed will be repeatedly pulled down to the bottom of the bed by the downdraft, further enhancing the result stated above.

Material which is not combusted in the fluidized bed will move along downward-sloping plate 11, as shown in (B) and (C). It will be routed by guide plates 14-1 and 14-2 to line 14 and thereby discharged to the exterior.

FIG. 10 shows an improved internal configuration for the pyrolysis furnace which is used in each of the embodiments previously discussed. (A) is a front cross sectional view; (B) is a cross sectional plan view; (C) is a view from the left side.

In FIG. 10, the interior of pyrolysis furnace 1 is divided by partition panels 80 into a number of compartments from the side on which the sand or other fluidized bed medium 2-1 is loaded onto dispersion plate 3-1 (the side where supply line 4 is connected) to the side from which the char mixture is removed (the side where discharge line 9 is connected). On one side of each of the said partition panels 80 a space 81 is left between the partition panel and the side wall of the furnace. Each space 81 is on the opposite side of the partition panel from the previous one. This is the configuration of primary fluidized bed 1A.

The lower portion of the primary fluidized bed 1A is extended outward, and a conveyor unit for conveying solid materials from the side on which the garbage is loaded to the side from which the char mixture is removed, specifically, a screw feeder 1C, is provided at the bottom of the bed. Line 82 allows air or combustion exhaust gases to be pumped as needed into the space directly below conveyor 1C. Auxiliary fluidized bed 1B, thus, fluidizes the sand or other fluidized bed medium.

In the pyrolysis furnace 1, as yet uncombusted matter which adheres to noncombustible material on conveyor 1C in auxiliary fluidized bed 1B can be combusted as it is conveyed by force in the direction of the char residue. This insures that no combustible material will be exhausted with the noncombustible matter.

Partition panels 80 in primary fluidized bed 1A have the effect of lengthening the flow within the fluidized bed. In other words, the partition panels lengthen the course traveled by the garbage and fluidized bed medium as they are mixed together and drawn toward discharge line 9. This arrangement insures that raw garbage will never arrive at discharge line 9. Pyrolysis can be executed uniformly and over a specified period of time. Because a uniform pyrolytic reaction can be induced which occurs for a sufficient period of time, the chlorine compounds in the garbage can in effect be completely pyrolyzed, gasified and removed.

FIG. 11 shows an improved version of the pyrolysis furnace employed in each of the embodiments discussed above. This pyrolysis furnace has an integral pyrolysis gas combustion furnace which comprises a combustion chamber. (A) is a side view of the furnace pictured in FIG. 1 and the combustion chamber. (B) shows a modification of the narrow portion. (C) is a front view.

Over the center of the fluidized bed furnace constituting pyrolysis furnace 1, the walls narrow to form neck 411. Above this narrow neck is combustion chamber 40. On the narrow neck 411 are an array of air nozzles 42. An air inlet 43 is provided on the upper portion of the combustion chamber 40.

As is shown in FIGS. 11 (A) and (C), the neck 411 tapers from the main part of the chamber toward air nozzles 42, which are arrayed horizontally. The neck could also have a narrow outlet, or, as shown in (B), it could be a narrow cylinder with a pair of air inlets 21 diagonally opposite each other to create a rotary air flow.

The pyrolysis gases generated in pyrolysis furnace 1 are conducted through neck 411 into combustion chamber 40. The air introduced through line 21 and propelled by nozzles 42 causes primary combustion of the pyrolysis gases to occur in a reductive atmosphere (with an excess coefficient of 0.6 to 0.8) so that the NOx content is reduced. Air is introduced into the upper chamber via inlet 43 to induce secondary combustion. The pyrolysis gases should be completely combusted to minimize the CO and dioxin content.

Providing a neck 411 between the combustion chamber 40 and pyrolysis furnace 1 facilitates the mixing of air into the gases. In addition, it prevents the heat from the secondary combustion in chamber 40 from radiating into the space occupied by the fluidized bed below it. This prevents the char from combusting so that the desired conditions of pyrolysis can be achieved in furnace 1.

FIG. 12 is a system diagram of a sixth preferred embodiment of this invention, another apparatus to produce superheated steam using the heat from incinerating waste material. The char combustion furnace in FIG. 2 has been partitioned into two fluidized beds and a backflow prevention means and an ash melting furnace have been provided.

FIG. 13 is a system diagram of a seventh preferred embodiment of this invention, another apparatus to produce superheated steam using the heat from incinerating waste material. Using the configuration shown in FIG. 12, a portion of the pyrolysis gases is supplied via a branch line to a pyrolysis gas combustion furnace for the combustion of pyrolysis gases.

FIG. 14 shows a pressure differential gauge 100 for measuring a pressure differential, which is installed in the outlet line for pyrolysis gases shown in FIG. 13. (A) is a pressure differential gauge which employs orifices. (B) is a pressure differential gauge which employs a horn neck.

With this configuration, the pyrolysis gases discharged via line 7 are conducted into ash melting furnace 31.

Further, as can be seen in FIG. 13, some of the pyrolysis gases discharged via line 7 branch off before the remainder are fed into ash melting furnace 31.

In furnace 31, a rotary flow may be used to introduce the dust and ash from line 29 and the air or oxygen-enriched air along with the pyrolysis gases from line 30. The heat of combustion of the pyrolysis gases, which is over 1,300° C., melts the ash. The melted dust and ash descend through line 32 into reservoir 32A, where water-cooled slag forms in particles several millimeters in diameter. This slag can be used as an architectural aggregate. Ash is fed into the furnace 31 via line 18, the discharge line from cyclone 16, and dust line 29. Noncombustible material from line 14 and/or any ash collected by a bag filter or an electric dust collector can also be melted.

Pyrolysis gas combustion furnace 34 having a combustion chamber for pyrolysis gases, is placed on the downstream end of discharge line 33 of the ash melting furnace 31. Sufficient air to combust the pyrolysis gases is supplied via line 21A, and the gases are completely combusted.

The pyrolysis gases, which are removed from furnace 1 through discharge line 7, are conducted into ash melting furnace 31 before being fed into pyrolysis gas combustion furnace 34.

In this embodiment, then, the ash separated by the bag filter(s) on the downstream end of the cyclone 16 or line 25 and/or the noncombusted material from line 14 are conducted into the ash melting furnace 31. The melted ash can be used to produce aggregate.

If line 7 branches into lines 7' and 7-1, as shown in FIG. 13, it will be necessary to measure the volume of flow using differential pressure gauge 100.

Differential pressure gauge 100 measures the volume of flow (or rate of flow) of the pyrolysis gases removed from pyrolysis furnace 1. In this differential pressure gauge, a small volume of air is injected as needed into the two discharge ports 109 on the inlet and outlet sides of neck 110, the narrow portion which forms the pressure gauge 100, to combust any tars in the pyrolysis gases. This is done to prevent tar buildup or coking in discharge ports 109 or neck 110.

FIG. 14 (A) shows a differential pressure gauge which employs a number of orifices. 101 and 101' are the pipes constituting discharge line 7. 102 are flanges. 103 are orifice plates. 104 is a differential pressure gauge unit. 105, 106, 107 and 108 are air inlet pipes. 109 are pressure taps used to remove pressure. 110 is a neck. 111 are valves to control air volume. 112 are flowmeters or other devices to measure flow. Four pressure taps 109 are placed at 90° intervals as shown in the cross section taken across line A-A.

FIG. 14 (B) is a differential pressure gauge which employs a horn neck 110. Its configuration is identical to that shown in FIG. 14 (A).

FIG. 15 is a system diagram of an eighth preferred embodiment of this invention, another apparatus to produce heated steam using the heat from incinerating waste material. A portion of the pyrolysis gases obtained from the pyrolysis furnace 1 on the upstream side of ash melting furnace 31 may be supplied via branch line 7-2 to the inlet port below dispersion plate 3-1 in the same pyrolysis furnace 1.

As a result, the pyrolysis gases in line 7-1 will not be diluted by the fluidizing gas (composed primarily of inert gases such as $N_2$, $CO_2$, or $H_2O$) and will remain high in calories so that the temperature in ash melting furnace 31 can easily be raised to 1,300° C. to 1,500° C.

FIG. 16 is a system diagram of a ninth preferred embodiment of this invention, another apparatus for producing superheated steam using the heat from incinerating waste material. Here the pyrolysis furnace does not employ a fluidized bed, but a mechanical agitator to mechanically agitate and convey the waste material.

1A is a pyrolysis furnace with the mechanical agitator which can mechanically agitate the solids within the pyrolysis device while at the same time conveying them from the inlet for the garbage to the outlet for the char mixture. This mechanical agitator to agitate and convey the waste material may be a rotary kiln or an agitation tank with a horizontal screw feeder. The sand or other fluidized bed medium is stored, and the sand and garbage or other waste material are loaded via supply line 4 and circulation line 5. The agitation chamber is brought up to a temperature of 300° C. by heated air or combustion exhaust gases supplied by line 6. While the sand and waste material are being mixed together and agitated by the rotary kiln or horizontal screw feeder agitation tank, a pyrolytic reaction of the waste material is induced. The resulting char mixture of unpyrolyzed residue and sand is mechanically conveyed toward discharge line 9. It is sent from line 9 to char combustion furnace 10 by way of sieve 90 and line 91. The pyrolysis gases generated in the pyrolytic reaction in the agitation chamber are removed via discharge line 7. The noncombustible material separated by sieve 90 is removed via discharge line 8.

As was explained earlier, it is desirable that pyrolysis be carried out so as to obtain a calorie ratio of the pyrolysis gases to the char mixture of approximately 7 (pyrolysis gases) to approximately 3 (char mixture).

An air inlet line 21 is connected to discharge line 7 on pyrolysis furnace 1A. Air is introduced into the pyrolysis gases removed from furnace 1A to combust some of the tars they contain so as to prevent tar buildup and coking in discharge line 7. The pyrolysis gases are sent to ash melting furnace 31 before being conducted to pyrolysis gas combustion furnace 34.

Other aspects of the configuration are identical to those in FIG. 15.

FIG. 17 is a system diagram of a tenth preferred embodiment of this invention, another apparatus for producing superheated steam using the heat from incinerating waste material. Here a number of pyrolysis furnaces are employed.

We shall discuss only those aspects of the configuration which differ from those shown in FIGS. 15 and 16.

Two pyrolysis furnaces are provided, each of which comprises a fluidized bed.

In the pyrolysis furnaces 1 and 1', the sand or other fluidized bed medium 2-1 and 2-1' is loaded onto dispersion plates 3-1 and 3-1', which are perforated plates or the like. The garbage or other waste material and the sand are loaded via supply lines 4 and 4' and circulation (return) lines 5 and 5'. The combustion exhaust gases supplied via inlet lines 6 and 6' raise the temperature of the fluidized bed in pyrolysis furnace 1 (first pyrolysis furnace) to between 250° C. and 450° C., inducing a pyrolytic reaction of the waste material and actively generating a char mixture. This mixture is supplied via discharge line 9 to char combustion furnace 10. The pyrolysis gases generated by this reaction are removed via discharge line 7 to pyrolysis gas combustion furnace 34. Noncombustible material is removed from discharge line 8.

In the other pyrolysis furnace 1' (second pyrolysis furnace), a pyrolytic reaction of the waste material is induced in a fluidized bed which has been brought to a temperature of 450° C. to 700° C. This removes chlorine compounds and actively promotes the generation of pyrolysis gases, which are supplied via discharge line 7' to ash melting furnace 31. The unpyrolyzed char mixture is removed to char combustion furnace 10 via discharge line 9'; the noncombustible material is removed via discharge line 8'.

Thus the first pyrolysis furnace 1, is used to generate a large volume of dechlorinated char mixture, while the second pyrolysis furnace 1' generates only a small volume of char mixture but purposefully generates pyrolysis gases which can be used in ash melting furnace 31. This division of functions enhances the efficiency with which both the char mixture and the pyrolysis gases can be generated.

Since pyrolysis furnace 1 serves only to dechlorinate the waste material, its fluidized bed can have a temperature range from 250° C. to 450° C. This allows furnace 1 to generate a large volume of char mixture.

The gases introduced into ash melting furnace 31 have a temperature of 450° C. to 700° C. and have been fully pyrolyzed, so injecting even a small volume of oxygen-enriched air into furnace 31 will allow its temperature to be maintained at 1,300° C.

FIG. 18 is a system diagram of an eleventh preferred embodiment of this invention, another apparatus for producing superheated steam using the heat from incinerating waste material. Here the pyrolysis furnace comprises both a fluidized bed and a mechanical agitator to agitate and convey the waste material.

In this embodiment, the first pyrolysis furnace, furnace 1 in FIG. 17, is unchanged, while the second pyrolysis furnace, furnace 1', comprises the mechanical pyrolysis furnace 1A in FIG. 16. In other words, the second furnace has a mechanical agitator to agitate the solids within the pyrolysis furnace while at the same time conveying them from the inlet for the waste material to the outlet for the char mixture. This device to agitate and convey the waste material may be a rotary kiln or an agitation tank with a horizontal screw feeder.

When the pyrolysis furnace uses mechanical agitation, as furnace 1A does, there is no need for the fluidizing gas (an inert gas composed mainly of $N_2$, $CO_2$ and $H_2O$) required by a fluidized bed. The pyrolysis gases are not diluted, so the caloric value per unit volume is higher. Using air or oxygen-enriched air, a temperature of 1,300° C. can easily be generated. This can be used as an efficient energy source to melt the ash content of the gas. For this purpose the mechanical agitation furnace is preferable to a fluidized bed furnace such as furnace 1.

In other words, the low-temperature pyrolysis for producing char mixture uses a fluidized bed, and the high-temperature pyrolysis furnace 1' for producing high-calorie pyrolysis gases uses a mechanical agitator.

If a mechanical pyrolysis furnace is used in furnace 1', a temperature of 1,300° C. can be maintained in ash melting furnace 31 even without enriching the air fed into the furnace with oxygen.

A portion of the pyrolysis gases obtained from the other pyrolysis furnace 1' is supplied via branch line 7' on the upstream side of ash melting furnace 31 to pyrolysis gas combustion furnace 34. Since the ash content of the pyrolysis or combustion gases will be approximately 10% of the waste material. There is, therefore, no need to use all the pyrolysis gases supplied for melting the ash. Having a branch line for a portion of the pyrolysis gases prevents the ash melting furnace from wasting the excess heat energy.

In this arrangement, differential pressure gauge 100, shown in FIG. 14, should be installed either on the upstream side of ash melting furnace 31, to which the discharge line 7' branches, or on line 7' itself in order to adjust the volume of flow.

EFFECTS OF THE INVENTION

As has been discussed above, the present invention improves the efficiency with which noncombustible materials are removed and fluidized bed medium is separated in a pyrolysis means for pyrolyzing waste material (pyrolysis furnace) and a char combusting means for combusting char (char combustion furnace) which enable stable pyrolysis and combustion. More specifically, this invention prevents the boiler pipes from being corroded by chlorine compounds without requiring the use of expensive, high-quality materials. It enables the collection of a larger volume of high-temperature, high-pressure steam of approximately 500° C.×100 kg/cm². This results in a generating efficiency of at least 30%. This enables removal of noncombustible materials and the fluidized bed medium in the pyrolysis means for waste materials and the char combustion means. Pyrolysis and char combustion can be accomplished in a more stable fashion.

The present invention provides partition panel to prevent backflow of char, fluidized bed medium or gases between the pyrolysis device and the char combustion device. The fluidized bed medium, with its temperature differential and a higher caloric value, cannot accidentally flow backward between the two chambers. This prevents backflow from causing temperature fluctuations or adversely affecting the conditions required for pyrolysis or combustion in either vessel.

Both the pyrolysis means to pyrolyze waste material and the char combustion means achieve the smooth fluidizing action which is the objective of their designs. The caloric ratio of the thermal energy of the pyrolysis gases obtained in the pyrolysis device and that of the combustion gases obtained in the char combustion device, which do not contain any chlorine compounds (i.e., the dechlorinated thermal energy), attain the desired objective without variance, as does the chlorine concentration.

With the present invention, pyrolysis is carried out efficiently in the pyrolysis device. Tar buildup and coking due to the pyrolysis gases are prevented, and concentrations of dioxin, CO and NOx are minimized. The chlorine content is reduced more efficiently than in the prior art, and more superheated steam is produced.

According to the present invention, the ash separated from the pyrolysis gases or combustion gases can be melted to produce aggregate or the like.

In one version of this invention, the pyrolysis means is not a fluidized bed, but a mechanical agitation means for mechanically agitating and conveying the waste material. This design allows the duration of pyrolysis and the volume of material pyrolyzed to be controlled more closely than does a fluidized bed, resulting in a more stable pyrolytic reaction. And because the pyrolysis gases are not diluted by a fluidized bed carrier gas, the caloric value per unit volume is higher.

In another version of this invention, the pyrolysis means comprises a number of pyrolysis furnaces which are an appropriate combination of fluidized beds and mechanical agitation tanks. If there are two pyrolysis furnaces, each can be set at a different temperature of pyrolysis. The low-temperature furnace can be set at 250° C. to 450° C. to facilitate the production of dechlorinated char mixture. The high-temperature furnace can be set at 450° C. to 700° C. to generate pyrolysis gases for use in the ash melting furnace.

Various other effects are also achieved.

What is claimed is:

1. A method for producing superheated steam using incineration heat of waste materials comprising the steps of:

heating pressurized boiler water which has a boiling point of approximately 200° C. to 320° C., to said boiling point with a chlorine-containing energy source of pyrolysis gases in a pyrolysis means;

heating said boiler water above said boiling point with a chlorine-free energy source obtained from a char combustion means to produce superheated steam of a predetermined temperature;

wherein each of said pyrolysis means and said char combustion means is disposed separately as a different furnace, said pyrolysis means generating the chlorine-containing energy source by pyrolyzing chlorine-containing waste materials in an oxygen-poor fluidized space into which combustion gas from which oxygen has been consumed is mainly introduced and in which fluidized bed medium of approximately 300° C. or higher fluidizes, said char combustion means generating the chlorine-free energy source by combusting unpyrolyzed residue while the char mixture of fluidized bed medium and the unpyrolyzed residue drawn from the pyrolysis means fluidize in a fluidized bed.

2. An apparatus for producing superheated steam using incineration heat of waste materials, comprising:

a pyrolysis means for pyrolyzing chlorine-containing waste materials in an oxygen-poor fluidized space into which combustion gas from which oxygen has been consumed is mainly introduced and in which fluidized bed medium of approximately 300° C. or higher fluidizes;

a char combustion means for generating a chlorine-free energy source by combusting unpyrolyzed residue while the char mixture of fluidized bed medium and the unpyrolyzed residue drawn from the pyrolysis means fluidize in a fluidized bed;

wherein each of said pyrolysis means and said char combustion means is disposed separately as a different furnace, and a backflow prevention means for preventing backflow of char or fluidized bed medium and gases, said backflow prevention means being provided in a path connecting said pyrolysis means and said char combustion means, or at a side of said pyrolysis means or said char combustion means.

3. An apparatus for producing superheated steam using incineration heat of waste materials according to claim 2, wherein said backflow prevention means is provided at the side of at least one char combustion means to push back said fluidized bed medium toward said pyrolysis means, and is configured by a pressure differential generating means to generate a pressure differential larger than a differential ($P_1$–$P_2$) between a pressure value $P_1$ in said pyrolysis means and a pressure value $P_2$ in said char combustion means.

4. An apparatus for producing superheated steam using incineration heat of waste materials according to claim 2, wherein said backflow prevention means comprises a mechanical conveyor which conveys said char mixture.

5. An apparatus for producing superheated steam using incineration heat of waste materials, comprising:

a pyrolysis means for generating a chlorine-containing energy source by pyrolyzing chlorine-containing waste materials in an oxygen-poor fluidized space into which combustion gas from which oxygen has been consumed is mainly introduced and in which fluidized bed medium of approximately 300° C. or higher fluidizes;

a char combustion means for generating a chlorine-free energy source by combusting unpyrolyzed residue while the char mixture of fluidized bed medium and the unpyrolyzed residue drawn from the Pyrolysis means fluidize in a fluidized bed;

wherein each of said pyrolysis means and said char combustion means is disposed separately as a different furnace;

a first steam generating means disposed in the region of pyrolysis means for producing hot water or steam having a temperature below approximately 400° C. using thermal energy from said pyrolysis gases; and a second steam generating means disposed in the region of char combustion means for producing superheated steam from said hot water or steam produced by said first steam generating means using thermal energy from said char combustion means.

6. An apparatus for producing superheated steam using incineration heat of waste materials according to claim 5, wherein said steam produced in either said first or second steam generating means or a portion of said hot water or steam fed into either of said means is conducted as needed to a heat exchanging means in a high-temperature region of said char combustion means.

7. An apparatus for producing superheated steam using incineration heat of waste materials according to claim 5, further comprising an auxiliary char combustion means along a circulation path for fluidized bed medium heated in said char combustion means, in which another heat exchanging means provided in said auxiliary char combustion means to further heat said steam heated by either said first or second steam generating means or by a heat exchanging means arranged in a high-temperature region of said char combustion means.

8. An apparatus for producing superheated steam using incineration heat of waste materials according to claim 5, further comprising an auxiliary char combustion means provided with a thermal mitigation means which is disposed in a circulation path of heated fluidized bed medium from said char combustion means to said pyrolysis means so as to mitigate thermal drop.

9. An apparatus for producing superheated steam using incineration heat of waste materials according to claim 8, wherein a thermal mitigation means comprises a heat exchanging means which is disposed in a circulation path of heated fluidized bed medium from said char combustion means to said pyrolysis means so as to mitigate thermal drop.

10. An apparatus for producing superheated steam using incineration heat of waste materials according to claim 9, further comprising:

a heat exchanging means provided in said auxiliary char combustion means; and a backflow prevention means provided at downward region from said heat exchanging means, said backflow prevention means comprising a pressure differential generating means for generating a pressure differential larger than a differential ($P_1$–$P_2$) between a pressure value $P_1$ in said pyrolysis means and a pressure value $P_2$ in said char combustion means.

11. An apparatus for producing superheated steam using incineration heat of waste materials according to claim 5, further comprising:

a first filtering means for separating materials discharged through an uncombusted material discharge port on said pyrolysis means into any large chunks of noncombustible materials and remaining materials, and for supplying said remaining materials to a bottom of said char combustion means, and a second filtering means for separating materials discharged through an uncombusted material discharge port on said combustion means into finer noncombustible materials and said fluidized bed medium, and for supplying said fluidized bed medium to said bottom of said char combustion means.

12. An apparatus for producing superheated steam using incineration heat of waste materials according to claim 11, further comprising a third filtering means for separating ash provided on said discharge port of said second filtering means, and for supplying said fluidized bed medium separated from said ash to said bottom of said char combustion means.

13. An apparatus for producing superheated steam using incineration heat of waste materials according to claim 5, wherein said char combustion means comprises a fluidizing vessel which fluidizes and circulates said char mixture in said fluidized bed by a circulation means to circulate said char mixture in the fluidized bed by supplying a stream of air or combustion exhaust gases provided by dividing into two streams of air supplied from below a dispersion plate, or by partitioning said fluidized bed by partition panels.

14. An apparatus for producing superheated steam using incineration heat of waste materials according to claim 13, wherein said circulation means provides a plurality of divided gas flows supplied from below said dispersion plate, and controls the volume of said plurality of divided air flows so that said char mixture circulates in said fluidized bed.

15. An apparatus for producing superheated steam using incineration heat of waste materials according to claim 5, wherein said pyrolysis means introduces a stream of air into an upper air space of said chamber at one stage or multiple stages, and combusts said pyrolysis gases completely, and wherein a lower space of said chamber is narrowed so as to promote mixing of said stream of air and said pyrolysis gases, and prevent backflow of radiant heat.

16. An apparatus for producing superheated steam using incineration heat of waste materials according to claim 5, wherein said pyrolysis means comprises:

a main fluidized bed which comprises fluidized bed medium loaded on a dispersion plate, and which is fluidized by a stream of air or combustion exhaust gases from beneath of said dispersion plate; and a conveyor means on a bottom of said chamber widened toward lower side wall of said main fluidized bed to convey solid portions of said waste materials from a supply port for said waste materials to a discharge port for said char mixture.

17. An apparatus for producing superheated steam using incineration heat of waste materials according to claim 5, and further comprising:

an ash sludge separation means for extracting sludge from ash separated from gases exhausted from either said char combustion means or said pyrolysis means by primary combustion heat of the said pyrolysis gases, said separation means further comprising a secondary combustion means to combust remaining pyrolysis gases after said ash is separated by said ash sludge separation means.

18. An apparatus for producing superheated steam using incineration heat of waste materials according to claim 17, wherein said pyrolysis gases exhausted from said pyrolysis means is supplied to said ash sludge separation means, and a portion of said pyrolysis gases is branched to said secondary combustion means.

19. An apparatus for producing superheated steam using incineration heat of waste materials according to claim 5, wherein said pyrolysis means comprises a pyrolysis furnace comprising a mechanical conveyor/agitation means for conveying solid portions of said waste materials in said pyrolysis means from a supply port of said waste materials to a discharge port for said char mixture.

20. An apparatus for producing superheated steam using incineration heat of waste materials according to claim 5, wherein said pyrolysis means comprises a plurality of pyrolysis furnaces configured by an appropriate combination of fluidized beds and mechanical agitation tanks; and said mechanical agitation tanks are set at different pyrolysis temperatures.

21. An apparatus for producing superheated steam using incineration heat of waste materials according to claim 20, wherein said pyrolysis gases generated in the pyrolysis furnace with higher temperature are supplied to an ash-sludge separation means to extract sludge from ash separated from gases discharged from said char combustion means or said pyrolysis means.

22. An apparatus for producing superheated steam using incineration heat of waste materials according to claim 5, and further comprising:

a narrowed portion in a discharge port for pyrolysis gases generated in a pyrolysis reaction in an oxygen-poor fluidized space into which combustion gas from which oxygen has been consumed is mainly introduced and in which fluidized bed medium of approximately 300° C. or higher fluidizes where waste material is supplied, wherein said discharge port discharges said pyrolysis gases to a secondary combustion means or to a heat exchange means; and an air supply port for introducing a small quantity of air through pressure vents on an inlet and outlet sides of said narrow portion in order to measure flow volume of said pyrolysis gases.

23. An apparatus for producing superheated steam using incineration heat of waste materials according to claim 22, wherein a portion of said pyrolysis gases from said pyrolysis reaction is supplied to a supply port of said pyrolysis chamber.

* * * * *